(12) United States Patent
Markou et al.

(10) Patent No.: US 9,914,840 B2
(45) Date of Patent: Mar. 13, 2018

(54) PROCESS FOR PREPARING PIGMENT AND FILLER CONTAINING FORMULATIONS

(71) Applicants: BASF COATINGS GMBH, Munster (DE); HENKEL AG & CO. KGAA, Dusseldorf (DE)

(72) Inventors: Konstantinos Markou, Cologne (DE); Andreas Niegemeier, Dusseldorf (DE); Sabine Holtschulte, Ascheberg (DE); Jerome Moebius, Kaarst (DE)

(*) Notice: Subject to any disclaimer, the term of this patent is extended or adjusted under 35 U.S.C. 154(b) by 0 days.

(21) Appl. No.: 15/105,069

(22) PCT Filed: Dec. 20, 2013

(86) PCT No.: PCT/EP2013/077682
§ 371 (c)(1),
(2) Date: Jun. 16, 2016

(87) PCT Pub. No.: WO2015/090443
PCT Pub. Date: Jun. 25, 2015

(65) Prior Publication Data
US 2017/0002213 A1    Jan. 5, 2017

(51) Int. Cl.
*C09D 5/44* (2006.01)
*C09D 17/00* (2006.01)
*C09D 5/08* (2006.01)
*C25D 13/06* (2006.01)

(52) U.S. Cl.
CPC .............. *C09D 5/4457* (2013.01); *C09D 5/08* (2013.01); *C09D 5/4438* (2013.01); *C09D 5/4492* (2013.01); *C09D 17/004* (2013.01); *C09D 17/005* (2013.01); *C09D 17/006* (2013.01); *C09D 17/007* (2013.01); *C09D 17/008* (2013.01); *C25D 13/06* (2013.01)

(58) Field of Classification Search
CPC .................................... C09D 5/4457

USPC ......................................................... 428/461
See application file for complete search history.

(56) References Cited

U.S. PATENT DOCUMENTS

2005/0173248 A1    8/2005  Fung et al.

FOREIGN PATENT DOCUMENTS

| DE | 10106574 A1 | 8/2002 |
|---|---|---|
| WO | 2003037952 A1 | 5/2003 |
| WO | 2008156125 A2 | 12/2008 |

OTHER PUBLICATIONS

International Search Report, dated Mar. 20, 2014; Six (6) Pages.

*Primary Examiner* — Terressa Boykin
(74) *Attorney, Agent, or Firm* — Dickinson Wright PLLC

(57) ABSTRACT

The invention relates to aqueous, cationically stabilized primary dispersions comprising dispersed polymer particles that have a Z-average particle diameter of 5 to 500 nm and are obtainable by emulsion polymerization of at least one olefinically unsaturated monomer (A), wherein the emulsion polymerization takes place in the presence of one or more emulsifiers (E) having the following general formula: $R^1$—$(R^2)(R^3)$, where: R is a moiety that contains at least one aromatic group and at least one aliphatic group, has 15 to 40 carbon atoms, and contains at least one functional group selected from hydroxy groups, thiol groups, and primary or secondary amino groups and/or comprises at least one carbon-carbon multiple bond; and $R^1$, $R^2$, and $R^3$ are, independently of each other, identical or different aliphatic moieties having 1 to 14 carbon atoms. The invention also relates to a method for producing the primary dispersions, coating agents comprising the primary dispersions, use of the primary dispersions to produce electrocoats, and conductive substrates that have been coated with the coating agent compositions.

30 Claims, No Drawings

PROCESS FOR PREPARING PIGMENT AND FILLER CONTAINING FORMULATIONS

The present invention relates to a method for producing pigment- and/or filler-containing formulations with the use of aqueous, cationically stabilized primary dispersions containing polymer particles having a mean particle diameter of 5 to 500 nm (so-called polymerized "miniemulsions"). The present invention also relates to the formulations obtainable by said method, and use thereof.

It is common in coating agent manufacturing to produce pigmented and/or filler-containing lacquer systems with the use of so-called pigment pastes or filler pastes, which contain pigments predispersed at high concentration. The predispersion here is typically performed with the use of polymeric binders, which are to wet the pigment surfaces on one hand and must have favorable compatibility with the lacquer systems in which the pastes are later used. Ideally, the binders that are used to produce the pigment and/or filler preparation correspond to the main binders of the lacquer systems in which they are used.

In many cases, however, the main binders of the pigmented and/or filler-containing lacquer systems are unsuitable for de-aggregating the pigments and/or fillers effectively and preventing reagglomeration. In such cases, it is recommended to use so-called special grinding resins in the manufacture of the pigment and/or filler preparations. For example, amine-modified aromatic epoxy resins, which are frequently used as main binder in the manufacture of electrocoats, are less suitable—with respect to the wetting properties thereof—for wetting pigment and/or filler surfaces. Usually, special grinding resins are thus used here. Though these can also be obtained by modifying epoxy compounds with amines, it is necessary to incorporate molecular building blocks that can undergo particularly favorable interaction with the pigment and/or filler surfaces. Overall, however, there is a need for binder systems that are suitable both as main binders in the coating agent and as grinding resin for producing pigment preparations therefor or for other coating agents.

Particularly with regard to the production of electrocoats, there is the desire for a solution with which the main binder or one of the main binders can also be used as grinding resin. Electrocoats are aqueous coating agent systems that are applied cathodically or anodically—preferably cathodically—according to the process of the electrocoating.

In cathodically depositable electrocoats, aqueous dispersions based on epoxy amine resins are usually used as main binder. In some cases, however, amine-functionalized acrylate resins may be used as well.

Thus, as an example, WO 82/00148 disclose producing cathodically depositable primary dispersions with the use of cationically adjustable emulsifiers. The emulsifiers may bear reactive groups by which they can be integrated into the polymeric resin system in the cross-linking reaction. Explicitly-cited examples of emulsifiers are the acetic acid salts of fatty mono- and diamines, such as primary tallow amines and oleylamines or the acetic acid salts of tallow amines and oleylamines. Tallow amines and oleylamines contain hydrocarbon chains having at least one carbon-carbon double bond. Polymeric emulsifiers may also be used, such as, for example, an epoxy phenolic adduct, which has been reacted with diethanolamine and cationically adjusted with acetic acid. Some embodiments of WO 82/00148 use Ethoduomeen™ T13, which constitutes a tertiary amine having an unsaturated alkyl moiety, as a co-emulsifier. The manufacturer, Akzo Nobel, indicates that this involves N',N',N-Tris-(2-hydroxyethyl)-N-tallowyl-1,3-diaminopropane. WO 82/00148 teaches that the cationically adjusted emulsifiers are the only cationic components of the resin system. The primary dispersions of WO 82/00148 can also be called "miniemulsions".

Miniemulsions are dispersions of water, an oil phase, and one or more surface-active substances, wherein the dispersed particles have a mean particle diameter of 5 to 500 nm, preferably 25 to 500 nm, and particularly preferably 50 to 500 nm. Miniemulsions are regarded as metastable (cf. Emulsion Polymerization and Emulsion Polymers, Editoren. P. A. Lovell and Mohamed S. El-Aasser, John Wiley and Sons, Chichester, N.Y., Weinheim, 1997, pp. 700ff; Mohamed S. El-Aasser, Advances in Emulsion Polymerization and Latex Technology, 30th Annual Short Course, Volume 3, Jun. 7-11, 1999, Emulsion Polymers Institute, Lehigh University, Bethlehem, Pa., U.S.A). So-called miniemulsions are widely used in the art, for example, in detergents, cosmetics, or personal care products, but also coating agent compositions such as, for example, electrocoats.

The manufacture of aqueous primary dispersions with the aid of miniemulsion polymerization is disclosed in, for example, international patent applications WO 82/00148 and WO 98/02466, or German patent applications DE 196 28 143 A1 and DE 196 28 142 A2. This known methods allow for the monomers to be copolymerized in the presence of different low-molecular, oligomeric, or polymeric hydrophobic substances of costabilizers (cf. DE 196 28 142 A2). In addition, hydrophobic, organic adjuvants that are poorly soluble in water, such as, for example, plasticizers can be incorporated into the monomer droplets of the miniemulsion, as can film-forming aids such as, for example, coalescents or other such organic additives (cf. DE 196 28 143 A1). WO 82/00148 describes, for example, the use of emulsifiers to stabilize the emulsions disclosed therein.

In a study by Grabs and Schmidt-Naake (Macromol. Symp. 2009, 275-276, S133-141), miniemulsions made of 2-aminoethyl methacrylate hydrochloride and styrene, butyl acrylate, and/or butyl methacrylate are produced and polymerized in-situ, wherein there occur resin particles that bear a positive surface charge due to the positive charge of the aminoethyl methacrylate monomer, and are thereby stabilized in the dispersion. Saturated cetyltrimethylammonium bromide, which has a quaternary N atom and therefore bears a permanent positive charge, can be used as a cationic co-emulsifier in the manufacture of the dispersion. The positive charge is compensated by halide anions in both cases.

Although the known aqueous primary dispersions and coating materials based on such primary dispersions already have numerous beneficial properties, there is still a need for primary dispersions that are suitable both as main binders of a coating agent and as grinding resins for producing pigment and/or filler preparations.

The present invention addresses the problem of providing a method for producing a pigment- and/or filler-containing formulation. The pigment- and/or filler-containing formulations obtainable according to the present invention are intended to be usable in aqueous coating agent compositions, which are to have an improvement in long-term stability. The aqueous coating agents produced therefrom are also intended to have better film formation properties, so as to be more broadly applicable than has previously been possible.

The present invention also addresses the problem of providing an aqueous preparation that contains the pigmentand/or filler-containing formulation of the present invention and can be used, in particular, in the field of electrocoating as a coating agent, in order to improve the film formation of the electrocoats and achieve enhanced corrosion protection for metallic substrates—in particular, aluminum substrates.

One of the problems addressed by the present invention was solved by providing a method for producing a pigment- and/or filler-containing formulation, wherein one or more solids selected from the group of the pigments and fillers are mixed with an aqueous, cationically stabilized primary dispersion comprising:

(I) dispersed polymer particles, which
 i. have a Z-average particle diameter of 5 to 500, preferably 25 to 500, and particularly preferably 50 to 500 nm, and
 ii. which can be obtained through emulsion polymerization of at least one olefinically unsaturated monomer (A), wherein the emulsion polymerization takes place in the presence of one or more emulsifiers (E) and/or (EQ) having the following formulas:

$R^1\text{—}N(R^2)(R^3)$ (E),

$R^1N^{\oplus}(R^2)(R^3)(R^4)X^{\ominus}$ (EQ)

where:
$R^1$ is a moiety that contains at least one aromatic group and at least one aliphatic group, has 15 to 40 carbon atoms, and contains at least one functional group selected from hydroxy groups, thiol groups, and primary or secondary amino groups and/or comprises at least one carbon-carbon multiple bond;
$R^2$, $R^3$, and $R^4$ are, independently of each other, identical or different aliphatic moieties having 1 to 14 carbon atoms; and
$X^{\ominus}$ stands for the acid anion of an organic or inorganic acid HX,
and optionally the pigments and/or solids are mechanically crushed.

The term "primary dispersion" is understood in coating technology to mean polymer dispersions that are produced through emulsion polymerization and have a discrete dispersed phase and a clearly-defined phase interface between the dispersed phase (polymer) and dispersant (water). Primary dispersions are generally thermodynamically unstable in relation to coagulation. They must be electrostatically or sterically stabilized, i.e., brought into a thermodynamically metastable state (for example, see B. Müller, U. Poth, Lackformulierung and Lackrezeptur, Vincentz Network, Hannover, 2nd ed., 2005).

"Aqueous" in connection with the primary dispersion to be used according to the invention—but also in connection with coating agent compositions and, in particular, electrocoat compositions described below—signifies herein that the volatile component—i.e., the component that is volatile with drying at a temperature of 180° C. over 30 min—of the primary dispersion or of the coating agent is preferably more than 50 wt. % water, particularly preferably more than 70% water, and very particularly preferably more than 90 wt. % water.

The term "miniemulsion" is understood herein to mean those primary dispersions where the primary dispersion particles thereof have an intensity-based Z-average particle diameter of 5 to 500 nm, preferably 25 to 500 nm, and preferably 50 to 500 nm. The primary dispersions of the present invention thus entail so-called miniemulsions. The "Z-average particle diameter" can be determined according to the principle of dynamic light scattering according to ISO 13321 and ISO 22412. For this purpose, it is possible to use, for example, a zetasizer Nano S from Malvern. The determination of the particle size is performed at 25° C., on a primary dispersion according to the invention that has been diluted with demineralized water (0.1 to 0.5 mL primary dispersion to 100 mL demineralized water). The measured is performed completely automatically, with the use of 1 to 2 mL sample volume in a disposable cuvette. The measurement is assessed by means of the standard software of the aforementioned measuring device.

With a view to the prior art, it is surprising and could not have been anticipated by a person skilled in the art that the problems addressed by the present invention can be solved by the pigment- and/or filler-containing formulations according to the invention, and by the method for producing same and the aqueous preparations produced from the formulations. It is especially surprising that the emulsifiers (E) or (EQ) to be used according to the invention do not disturb the running of the (co)polymerization and also do not lead to coagulation of the primary dispersions according to the invention, but instead are largely responsible for the improved properties of the primary dispersions, the pigment- and/or filler-containing formulation produced therefrom, and the aqueous preparations. The primary dispersions used according to the invention contain dispersed polymer particles. The size of the polymer particles arises directly from the manufacturing method described below. Herein, the Z-average particle size is 5 to 500 nm, preferably 25 to 500 nm, and particularly preferably 50 to 500 nm. The Z-average particle diameter is preferably 50 to 400 nm, particularly preferably 50 to 350 nm, and very particularly preferably 50 to 300 nm.

The primary dispersions preferably have a high solids content, for example, of over 20 wt. %, preferably over 30 wt. %. It is even possible to achieve solids contents of over 40 wt. %, up to 45 wt. %. Generally, the solids content is not above 60 wt. %. The solids content is determined by drying 2.0±0.2 g of the primary dispersion for 30 minutes at 180° C. The remaining residue is weighed and adjusted in relation to the test sample, thus giving the solids content. The primary dispersions according to the invention usually have a low viscosity, even with a high solids content, representing another special advantage of the primary dispersions and the pigment- and/or filler-containing formulations produced therefrom.

Olefinically Unsaturated Monomer (A)
An essential starting compound for producing the primary dispersions to be used according to the invention is the at least one olefinically unsaturated monomer (A). Within this document and, in particular, hereinbelow, the term "(meth)acryl" stands for "methacryl" and for "acryl".

Examples of suitable olefinically unsaturated monomers (A) are:
a1) substantially acid group-free (meth)acrylic acid esters such as (meth)acrylic acid alkyl esters or (meth)acrylic acid cycloalkyl esters having up to 20 carbon atoms in the alkyl or cycloalkyl radical, in particular, methyl, ethyl, propyl, n-butyl, sec-butyl, tert-butyl, hexyl, ethylhexyl, stearyl, and lauryl acrylate or methacrylate; cycloaliphatic (meth)acrylic acid esters, in particular, cyclohexyl, isobornyl, dicyclopentadienyl, octahydro-4,7-methano-1H-indene-methanol, or tert-butylcyclohexyl (meth)acrylate; (meth)acrylic acid oxaalkyl esters or oxacycloalkyl esters such as ethyltriglycol (meth)acrylate and methoxyoligoglycol (meth)acrylate having a number-average molecular weight $M_n$ (determined by gel permeation chromatography with the use of a polystyrene standard) of from preferably about 300 to 800 g/mol, or other ethoxylated and/or propoxylated hydroxy group-free (meth)acrylic acid derivatives. It is also possible to include minor amounts of higher-functional (meth)acrylic acid alkyl or cycloalkyl esters, such as ethylene glycol, propylene glycol, diethylene glycol, dipropylene glycol, butylene glycol, pentane-1,5-diol, hexane-1,6-diol, octahydro-4,7-methano-1H-indene-dimethanol or cyclohexane-1,2-, -1,3- or -1,4-diol di(meth)acrylate; trimethylolpropane di- or tri(meth)acrylate; or pentaerythritol di-, tri- or tetra(meth)acrylate. Within the framework of the present invention, minor amounts of higher-functional monomers are to be understood to mean amounts that will not lead to cross-linking or gelation of the copolymerizates (A);

a2) monomers bearing at least one hydroxy group, one primary/secondary/tertiary/quaternized amino group, one alkoxymethylamino group, or imino group per molecule and are substantially acid group-free, such as hydroxyalkylesters of acrylic acid, methacrylic acid, or another α,β-olefinically unsaturated carboxylic acid derived from an alkylene glycol esterified with the acid, or obtainable by reacting the α,β-olefinically unsaturated carboxylic acid with an alkylene oxide—in particular, hydroxyalkylesters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, and 4-hydroxybutyl acrylate, methacrylate, ethacrylate, crotonate, maleinate, fumarate, or itaconate; or hydroxycycloalkylesters such as 1,4-bis(hydroxymethyl) cyclohexane, octahydro-4,7-methano-1H-indene dimethanol or methylpropanediol monoacrylate, monomethacrylate, monoethacrylate, monocrotonate, monomaleinate, monofumarate, or monoitaconate; or reaction products of cyclic esters, such, as ε-caprolactone; or olefinically unsaturated alcohols such as allyl alcohol or polyols such as trimethylolpropane mono- or diallyl ether or pentaerythritol monoallyl, diallyl, or triallyl ether (what was stated regarding the higher-functional monomers a1) applies *mutatis mutandis* for these higher-functional monomers a2)); N,N-dimethylaminoethyl acrylate, N,N-diethylaminoethyl methacrylate, allylamine, or N-methyliminoethylacrylate, or N,N-di(methoxymethyl) aminoethyl acrylate and methacrylate, or N,N-di(butoxymethyl) aminopropyl acrylate and methacrylate; in the framework of this invention, the emulsifiers (E) that can be used according to the invention are not counted under the monomers a2), although some emulsifiers (E) meet the formal definition of the monomers a2);

a3) monomers bearing, per molecule, at least one acid group that can be converted into the corresponding acid anion group, such as acrylic acid, methacrylic acid, ethacrylic acid, crotonic acid, maleic acid, fumaric acid or itaconic acid; olefinically unsaturated sulfonic or phosphonic acids or their partial esters; or mono(meth)acryloyloxyethyl maleate, mono(meth)acryloyloxyethyl succinate, or (meth)acryloyloxyethyl phthalate. In the framework of the present invention, the monomers a3) are not used as the only monomers (A), but rather always in combination with other monomers (A), and only in such low amounts that the monomers a3) do not polymerize outside of the droplets of the miniemulsion;

a4) vinyl esters of α-branched monocarboxylic acids having 5 to 18 carbon atoms in the molecule. The branched monocarboxylic acids can be obtained by reacting formic acid or carbon monoxide and water with olefins in the presence of a liquid, highly acidic catalyst. The olefins may be cracking products of paraffin hydrocarbons, such as mineral oil fractions, and may contain both branched and straight-chain acyclic and/or cycloaliphatic olefins. Reacting such olefins with formic acid or with carbon monoxide and water produces a mixture of carboxylic acids with which the carboxyl groups are mainly on a quaternary carbon atom. Other olefinic starting materials are, for example, propylene trimer, propylene tetramer, and diisobutylene. However, the vinyl esters a4) may also be produced in a well-known manner from the acids, e.g, by reacting the acids with acetylene. Due to the favorable availability, it is particularly preferred to use vinyl esters of saturated aliphatic monocarboxylic acids having 9 to 11 carbon atoms, which are branched at the α carbon atom, in particular, Versatic® acids (cf. Römpp Lexikon Lacke and Druckfarben, Georg Thieme Verlag, Stuttgart, N.Y., 1998, Versatic®-Säuren, pp. 605 and 606);

a5) reaction products from acrylic acids and/or methacrylic acids with the glycidyl ester of an α-branched monocarboxylic acid having 5 to 18 carbon atoms per molecule, in particular, a Versatic® acid, or—instead of the reaction product—an equivalent amount of acrylic and/or methacrylic acid that is then reacted during or after the polymerization reaction with the glycidyl ester of an α-branched monocarboxylic acids having 5 to 18 carbon atoms per molecule, in particular, a Versatic® acid;

a6) cyclic and/or acyclic olefins such as ethylene, propylene, but-1-ene, pent-1-ene, hex-1-ene, cyclohexene, cyclopentene, norbornene, butadiene, isoprene, cyclopentadiene, and/or dicyclopentadiene;

a7) (meth)acrylamides such as (meth)acrylamide, N-methyl, N,N-dimethyl, N-ethyl, N,N-diethyl, N-propyl, N,N-dipropyl, N-butyl, N,N-dibutyl, N-cyclohexyl, N,N-cyclohexylmethyl and/or N-methylol, N,N-dimethylol, N-methoxymethyl, N,N-di(methoxymethyl), N-ethoxymethyl and/or N,N-di(ethoxyethyl) (meth)acrylamide;

a8) epoxy-containing monomers such as the glycidyl esters of acrylic acid, methacrylic acid, ethacrylic acid, crotonic acid, maleic acid, fumaric acid, and/or itaconic acid;

a9) vinyl aromatic hydrocarbons such as styrene, 1,1-diphenylethylene, α-alkyl styrenes, especially α-methyl styrene, and/or vinyltoluene; vinyl benzoic acid (all isomers), N,N-diethylaminostyrene (all isomers), α-methylvinyl benzoic acid (all isomers), N,N-diethylamino-α-methylstyrene (all isomers), and/or p-vinylbenzenesulfonic acid;

a10) nitriles such as acrylonitrile and/or methacrylonitrile;

a11) vinyl compounds, in particular, vinyl and/or vinylidene dihalides, such as vinyl chloride, vinyl fluoride, vinylidene chloride, or vinylidene difluoride; N-vinylamides such as vinyl-N-methylformamide, N-vinyl caprolactam, 1-vinylimidazole, or N-vinyl pyrrolidone; vinyl ethers such as ethyl vinyl ether, n-propyl vinyl ether, isopropyl vinyl ether, n-butylvinyl ether, isobutyl vinyl ether, and/or vinyl cyclohexyl ether; and/or vinyl esters such as vinyl acetate, vinyl propionate, vinyl butyrate, vinyl pivalate, and/or the vinyl ester of 2-methyl-2-ethylheptanoic acid;

a12) allyl compounds, in particular, allyl ethers and allyl esters such as allyl methyl, ethyl, propyl or butyl ether, or allyl acetate, propionate or butyrate;

a13) polysiloxane macromonomers having a number-average molecular weight $M_n$ of 1000 to 40,000 and a mean of 0.5 to 2.5 ethylenically unsaturated double bonds per molecule; in particular, polysiloxane macromonomers having a number-average molecular weight $M_n$ of 2,000 to 20,000, particularly preferably 2,500 to 10,000, and in particular 3,000 to 7,000, and a mean of 0.5 to 2.5, preferably 0.5 to 1.5 ethylenically unsaturated double bonds per molecule, as described in DE 38 07 571 A1 (pp. 5-7), DE 3706095 A1 (columns 3 to 7), EP 0358153 B1 (pp. 3-6), U.S. Pat. No. 4,754,014 A1 (columns 5-9), DE 4421823 A1, or international patent application WO 92/22615 (p. 12, line 18 to p. 18, line 10); and/or a14) acryloxysilane-containing vinyl monomers, which can be prepared by reacting hydroxy-functional silanes with epichlorohydrin and then reacting the reaction product with (meth)acrylic acid and/or hydroxyalkyl and/or hydroxycycloalkyl esters of (meth)acrylic acid.

Other examples of suitable monomers (A) can be found in German patent application DE 196 28 142 A1 (p. 2, line 50 to p. 3, line 7). In principle, any of the aforementioned monomers a1) to a14)—except for the monomer a3)—can be polymerized on its own.

According to the invention, however, it is advantageous to use at least two monomers (A), because so doing causes the characteristic profile of the resulting copolymerizates to vary widely in a particularly advantageous manner, and enables a very targeted adaptation of the characteristic profile to the intended use of the pigment- and/or filler-containing formulations to be used.

Preferably, the monomers (A) are selected so as to result in (meth)acrylate copolymerizates having a characteristic profile determined first and foremost by the above-described (meth)acrylates. It is then preferable to use vinyl aromatic hydrocarbons a9)—in particular, styrene—as comonomers (A).

The emulsifiers (E) and/or (EQ) used according to the invention may also be incorporated into the polymer as polymerizable monomers in copolymerization with the monomers (A) in the production of the primary dispersion, provided that the aliphatic group in the moiety $R^1$ comprises at least one alkenically or alkinically unsaturated carbon-carbon multiple bond.

If, for example, the emulsifier E1

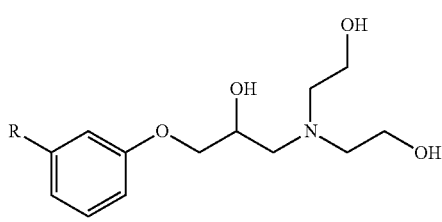

E1 described and used in the examples is used as the emulsifier (E), then it can be incorporated into the primary emulsion, where R stands for $C_{15}H_{31-2n}$ and n≠0, i.e., n=1, 2, and 3. In such a case, the emulsifier (E) of the general formula $R^1N(R^2)(R^3)$ contains 1, 2, or 3 carbon-carbon double bonds available for copolymerization with the monomers (A), in the residue $R^1$.

The same applies for the emulsifier EQ1

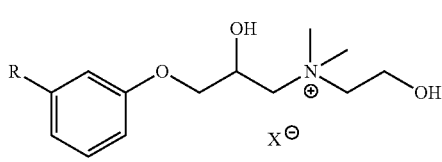

EQ1 described and used in the examples, where R stands for $C_{15}H_{31-2n}$ and n≠0, i.e., n=1, 2, or 3. In such a case, the emulsifier (EQ) of the general formula $R^1$—N⊕ $(R^2)(R^3)(R^4)$ $X^\ominus$ contains 1, 2, or 3 carbon-carbon double bonds available for copolymerization with the monomers (A), in the residue $R^1$.

Monomers from the above groups a1), a2), and a9) are preferably selected as monomers (A). From the group a1), it is particularly preferable to use alkyl esters of (meth)acrylic acid, such as, for example, $C_1$-$C_4$ alkyl esters of (meth)acrylic acid and isobornyl (meth)acrylate. From the group a2), it is very particularly preferable to use hydroxyalkyl esters of (meth)acrylic acid, such as, for example, hydroxy $C_2$-$C_4$ alkyl esters of (meth)acrylic acid, and/or aminoalkyl esters of (meth)acrylic acid, especially N,N-dialkylaminoalkyl esters of (meth)acrylic acid, very particularly preferably N,N-di-$C_1$-$C_4$ alkylamino-$C_2$-$C_4$-alkylesters of (meth)acrylic acid. Aminoalkyl esters of (meth)acrylic acid—especially N,N-dialkylaminoalkyl esters of (meth)acrylic acid, very particularly preferably N,N-di-$C_1$-$C_4$ alkylamino $C_2$-$C_4$ alkyl esters of (meth)acrylic acid—are particularly preferably used when the emulsifier (E) or (EQ) has no polymerizable carbon-carbon double bonds, i.e., is incapable copolymerizing with the monomers (A), and/or when the primary emulsion contains no additional cathodically depositable resins, such as, for example, epoxy amine resins. However, even in the presence of polymerizable emulsifiers (E) or (EQ) and/or other cathodically depositable resins, the aforementioned aminoalkyl esters of (meth)acrylic acid can be advantageously used. Vinyl aromatic hydrocarbons such as, in particular, styrene and/or 1,1-diphenylethylene can be preferably used as comonomers a9).

It is preferable to use at least one monomer (A) that contains reactive functional groups (a) that can undergo thermally initiated cross-linking reactions with groups (a) of the same type or with complementary reactive functional groups (b). These groups (a) or (a) and (b) may be present in the (co)polymerizates resulting from the monomers (A), which then have self-cross-linking properties. Accordingly, the relevant primary dispersions used according to the present invention and the coating materials according to the invention produced therefrom are also self-cross-linking.

However, the complementary reactive function groups (b) may also be present in the cross-linking agents (V) described below, which can be added to the primary dispersions before, during, and/or after production thereof. The relevant primary dispersions and formulations and preparations produced thereof are externally cross-linking in this case.

For the terms "self-cross-linking" and "externally cross-linking", additional reference is made to Rompp Lexikon Lacke and Druckfarben, Georg Thieme Verlag, Stuttgart, N.Y., 1998 (keyword: "Härtung" ("Curing"), pp. 274-276).

The selection of the respective complementary groups (a) or (a) and (b) thus focuses on not undergoing any undesired reactions during storage of the primary dispersions, and/or also not disturbing or inhibiting additional curing with actinic radiation, but also on in which temperature range the cross-linking is to take place.

It is preferable to use cross-linking temperatures of room temperature to 180° C. with the coating materials according to the invention. It is therefore preferable to use—on the one hand—monomers (A) having thio, hydroxy, methylol, methylol ether, N-methylol-N-alkoxymethylamino, imino, carbamate, allophanate and/or carboxyl group, but in particular amino, alkoxymethylamino, or hydroxy groups as they appear in the monomers a2), especially hydroxyl, and—on the other hand—cross-linking agents having anhydride, carboxyl, epoxy, blocked isocyanate, urethane, methylol, methylol ether, N-methylol-N-alkoxymethylamino, siloxane, amino, hydroxy, and/or 3-hydroxyalkylamide groups, but especially blocked isocyanate, urethane, or methylol ether groups. Methylol, methylol ether, and N-methylol-N-alkoxymethylamino groups are preferably used to produce self-cross-linking primary dispersions.

If particularly reactive complementary groups (a) or (b)—such as isocyanate groups—are used, then the components containing them—preferably the cross-linking agents—are added first, shortly before the use of the primary dispersions.

If less reactive complementary groups (a) or (b) are used, the components containing them are preferably added to the primary dispersions before or during the production, so that they are contained from the outside in the primary dispersions produced therefrom, and thus also in the formulations and preparations according to the invention. These formulations and preparations according to the invention are also identified by those skilled in the art as single-component systems. For example, electrocoats are typically such single-component systems. Preferably, the pigment- and/or filler-containing formulations of the present invention are formulated as single-component systems.

In terms of the molecular weight distribution, the (co) polymerizate formed from the monomers (A) and optionally emulsifier (E) or (EQ) is not subject to any restrictions. Advantageously, however, the (co)polymerization is carried out so as to result in molecular weight distribution $M_w/M_n$, as measured by gel permeation chromatography with the use of polystyrene as a standard, of <12, particularly preferably <10, and in particular <7.

Emulsifiers (E) and (EQ)
The emulsifiers (E) and/or (EQ) used to produce the primary dispersions have the general formulas:

  (E), and

  EQ), where:
$R^1$ is a moiety that contains at least one aromatic group and at least one aliphatic group, has 15 to 40 carbon atoms, and contains at least one functional group selected from hydroxy groups, thiol groups, and primary or secondary amino groups and/or comprises at least one carbon-carbon multiple bond;
$R^2$, $R^3$, and $R^4$ are, independently of each other, identical or different aliphatic moieties having 1 to 14 carbon atoms; and
$X^\ominus$ stands for the acid anion of an organic or inorganic acid HX.

A carbon-carbon multiple bond is to be understood herein to be a carbon-carbon double bond or a carbon-carbon triple bond. Preferably, the carbon-carbon multiple bond entails a carbon-carbon double bond.

Preferably, the moiety $R^1$ has an aromatic group $Gr_{arom}$ and two aliphatic groups $Gr_{ali1}$ and $Gr_{ali2}$ that are bonded to $Gr_{arom}$. Particularly preferably, the moiety $R^1$— has the structure $Gr_{ali1}$-$Gr_{arom}$-$Gr_{ali2}$.

Preferably, the moiety $R^1$ has at least one carbon-carbon multiple bond, particularly preferably at least one carbon-carbon double bond, in the at least one aliphatic group $Gr_{ali1}$. The presence of carbon-carbon multiple bonds—in particular, carbon-carbon double bonds—has a positive effect on the shear stability of the dispersions and coating agents produced with the use of the emulsifiers. In particular, undesired migration of the emulsifiers in the dispersions and coating agent composition can be prevented or reduced.

Particularly preferably, the moiety $R^1$ contains one to three carbon-carbon double bonds in the at least one aliphatic group $Gr_{ali1}$.

Very especially preferably, the moiety $R_1$ contains at least one carbon-carbon multiple bond—in particular, at least one carbon-carbon double bond, preferably one to three carbon-carbon double bonds—in the at least one aliphatic group $Gr_{ali1}$, and additionally at least one functional group selected from hydroxy groups, thiol groups, and primary or secondary amino groups in a second aliphatic group $Gr_{ali2}$ that is different from the aforementioned aliphatic group $Gr_{ali1}$. Hydroxy groups, thiol groups, and primary or secondary amino groups endow the emulsifier with reactivity to cross-linkers that are typical in lacquers, such as, for example, blocked or unblocked polyisocyanates, aminoplast resins such as, for example, melamine-formaldehyde resins, tris (alkoxycarbonylamino) triazines, which are different from the aforementioned cross-linkers, or even resins that contain epoxy groups. Primary dispersions containing such emulsifiers that bear hydroxy groups, thiol groups, and/or primary or secondary amino groups can thus be chemically incorporated into the coating agent during the curing process of a coating agent produced with the aid of the primary dispersions, whereby undesired migration of the emulsifier can be prevented or reduced.

The at least one aliphatic group $Gr_{ali1}$ in the moiety $R^1$, which bears at least one carbon-carbon double bond, may be linear or branched, but is preferably linear. The at least one aliphatic group $Gr_{ali1}$ in the moiety $R^1$ may also be substituted or unsubstituted, but is preferably unsubstituted. In addition, this aliphatic group may contain heteroatoms selected from the group consisting of O, S, and N, but is preferably heteroatom-free. This aliphatic group in the moiety $R^1$ is therefore particularly preferably linear, unsubstituted, and heteroatom-free, and contains one to three double bonds. Preferably, the group $Gr_{ali1}$ contains 8 to 30, particularly preferably 10 to 22, and very particularly preferably 12 to 18 carbon atoms—for example, 15 carbon atoms.

The at least one aliphatic group $Gr_{ali2}$ in the moiety $R^1$, which bears at least one functional group selected from hydroxy groups, thiol groups, and primary or secondary amino groups, among which OH groups are particularly preferable, and which is different from $Gr_{ali1}$, may be linear or branched but is preferably linear. The at least one aliphatic group $Gr_{ali1}$ in the moiety $R^1$ may also be substituted or unsubstituted, but is preferably unsubstituted. In addition, this aliphatic group may contain heteroatoms selected from the group consisting of O, S, and N, among which O is preferable. The aliphatic group $Gr_{ali2}$ is preferably directly bonded to the nitrogen atom appearing in the above general formula of the emulsifier (E) or (EQ). Any mention here of the "nitrogen atom in the general formula of the emulsifier (E) or (EQ) according to the invention" refers to the positively charged nitrogen bonded to the moieties $R^1$, $R^2$, $R^3$, and $R^4$. Preferably, the at least one functional group selected from hydroxy groups, thiol groups, and primary or secondary amino groups is in the beta position to the nitrogen atom of the above general formula of the emulsifier (E) or (EQ). If one of the aforementioned groups is in the beta position to the nitrogen atom of the general formula of the emulsifier (E), then there may form intramolecular hydrogen bonds to the tertiary nitrogen atom, reducing the catalytic properties of the tertiary nitrogen atom. As a result, this makes it possible to further enhance the dispersion stability and storage stability of such primary dispersions or pigment- and/or filler-containing formulations or coating agent compositions produced therefrom, which can commonly undergo amine-catalyzed reactions. A special advantage of the present emulsifiers (EQ) is the permanent positive charge of the nitrogen atom in the general formula of the emulsifier according to the invention. As a result, the permanently positive charge makes it possible to further enhance the dispersion stability and storage stability of such primary dispersions according to the invention or coating agent compositions produced therefrom, and to prevent an amine-catalyzed reaction.

Another advantage of such emulsifiers (E) and (EQ) in which a hydroxy group, thiol group, or primary or secondary amino group is in the beta position to the nitrogen atom of the emulsifier of the general formula (E) or (EQ) lies in the possibility of forming chelates with metal ions, which is advantageous when the pigment- and/or filler-containing formulations according to the invention are used specifically in coating agent compositions from which metal ions are to be deposited. Correspondingly chelated metal ions provide an improved deposition and can enhance the corrosion protection effect of such coatings. Very particularly preferably, a hydroxy group is in the beta position to said nitrogen atom. Preferably, the group $Gr_{ali2}$ contains 2 to 10, particularly preferably 2 to 8, and very particularly preferably 2 to 6 carbon atoms—for example, 2 or 3 carbon atoms.

The aromatic group $Gr_{arom}$ in the moiety $R^1$ is preferably a phenylene or naphthylene group, preferably a phenylene group. The aromatic group $Gr_{arom}$ may be substituted or unsubstituted, but is preferably unsubstituted. The aromatic group $Gr_{arom}$ may contain heteroatoms selected from the group consisting of O, S, and N, but is preferably heteroatom-free. Preferably, the group $Gr_{arom}$ contains 6 to 15, particularly preferably 6 to 12, and very particularly preferably 6 to 10 carbon atoms—for example, 6 carbon atoms.

Particularly preferable is a moiety ($R^1$—) of the formula:

where:
$Gr_{ali1}$ is linear, unsubstituted, and heteroatom-free, and has one to three—preferably one or two—double bonds;
$Gr_{arom}$ is a phenylene or naphthylene group; and
$Gr_{ali2}$ is linear, bears a hydroxy group preferably in the beta position to the nitrogen atom in the general formula of the emulsifier (EQ), and additionally contains O as a heteroatom, in the form of an ether group, wherein preferably in the case where $Gr_{arom}$ is a phenylene group, the groups $Gr_{ali1}$ and $Gr_{ali2}$ are bonded to the phenylene group in the meta position to one another.

The moieties $R^2$, $R^3$, and $R^4$ stand, independently of one another, for identical or different aliphatic moieties having 1 to 14, preferably 2 to 10, particularly preferably 2 to 8 carbon atoms. If $R^1$ does not contain a functional group selected from hydroxy groups, thiol groups, and primary or secondary amino groups, then it is particularly advantageous if at least one of the moieties $R^2$, $R^3$, and $R^4$ bears such a functional group. Very particularly preferably, at least two of the moieties $R^2$, $R^3$, and $R^4$ bear at functional group selected from hydroxy groups, thiol groups, and primary or secondary amino groups. Thereamong, hydroxy groups are very particularly preferable. Particularly preferably, said functional group is terminal in the moieties $R^2$, $R^3$, and $R^4$, but non-terminal in the moiety $R^1$.

The moieties $R^2$, $R^3$, and $R^4$ may then be linear or branched, but are preferably linear. $R^2$, $R^3$, and $R^4$ may bear carbon-carbon multiple bonds, but are preferably saturated.

Preferably, in addition to the above-mentioned hydroxy, thiol, and primary and secondary amino groups, the aliphatic moieties $R^2$, $R^3$, and/or $R^4$ contain at least one more—preferably exactly one more—functional group selected from ether groups, ester groups, and amide groups. The ether oxygen, the —O— of the —O—C(=O) group, and the amide nitrogen of the amide group are preferably in the beta position to the nitrogen atom of the general formula of the emulsifier (E) or (EQ).

In the emulsifiers (EQ), the anion $X^\ominus$ is the acid anion of an organic or inorganic acid HX, preferably excluding halides. Particularly preferably, this entails the anion of a monocarboxylic acid, such as, for example, the monocarboxylic acids used in the neutralization of cathodic electrocoat resins. Suitable anions of monocarboxylic acids are preferably those having 1 to 10 carbon atoms, such as, for example, formates, acetates, or lactates. Particularly preferably, $X^\ominus$ stands for anions of hydroxycarboxylic acids, in particular, for lactate.

In a particularly preferred embodiment of the present invention, the emulsifier (E) entails a cardanol amino polyol such as is described in Chinese patent applications CN 102633661 A and CN 102875394 A, having the following formula:

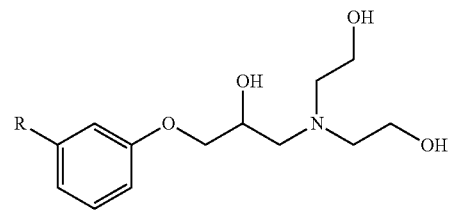

where $R=C_{15}H_{31-2n}$ and wherein n may=0 to 3, i.e., the moiety R may have 0 to 3 carbon-carbon double bonds. This compound entails the neutral form of the emulsifier E1, as it is described in the example section of the present invention. This compound is, for example, obtainable by adding diethanolamine to a cardanol glycidyl ether of the formula

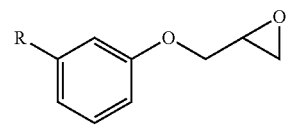

with R for $C_{15}H_{31-2n}$ and n=0 to 3, and thereupon opening the oxirane ring. Such cardanol glycidyl ethers are obtainable, for example, as Cardolite® NC 513 from Cardolite Europe N.V. (Gent, Belgium).

Starting from the cardanol glycidyl ether, it is possible to produce a large variety of preferred emulsifiers by adding an amine of the general formula $HN(R^2)(R^3)$ to the oxirane ring. Herein, the moieties $R^2$ and $R^3$ possess the meanings specified above.

In a particularly preferred embodiment of the present invention, the emulsifier (EQ) entails one such as is represented in the following formula:

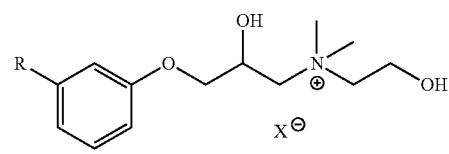

where R stands for $C_{15}H_{31-2n}$ and $X^{\ominus}$ stands for lactate or other anions of organic acids, and wherein n may=0 to 3, i.e., the moiety R may have 0 to 3 carbon-carbon double bonds. This compound is, for example, obtainable by adding N,N-dimethylethanolamine lactate to a cardanol glycidyl ether of the formula

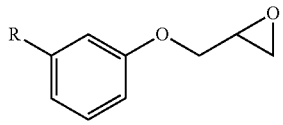

with R for $C_{15}H_{31-2n}$ and n=0 to 3, and thereupon opening the oxirane ring. Starting from the cardanol glycidyl ether, it is possible to produce, for example, a variety of preferred emulsifiers according to the invention by adding an ammonium salt of the general formula $HN^{\oplus}(R^2)(R^3)(R^4)(X^{\ominus})$ to the oxirane ring. Herein, the moieties $R^2$, $R^3$, and $R^4$ and $X^{\ominus}$ possess the meanings specified above.

The starting material for producing a cardanol glycidyl ether is the naturally occurring substance cardanol, which has the following formula

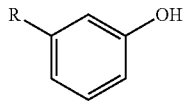

with R for $C_{15}H_{31-2n}$ and n=0 to 3. As is known from the chemistry of natural products, especially the chemistry of naturally occurring fats and oils and derived products thereof, these substances generally exist as a mixture of individual compounds having a different number of carbon-carbon double bonds. The natural product cardanol is one such mixture, with which the individual components differ in the number of the double bonds in the R chain. The most common individual components contain 0 to 3 double bonds. To produce the cardanol glycidyl ether, cardanol is reacted, for example, with epichlorohydrin.

For all embodiments of the primary dispersions to be used according to the invention, it is the case that not only one emulsifier (E) or (EQ) but even a mixture of a plurality of emulsifiers (E) and/or (EQ) can be used. Particularly preferable thereamong are those mixtures with which a portion of the emulsifiers bear carbon-carbon multiple bonds in the moiety $R^1$ and another portion does not contain carbon-carbon multiple bonds in the moiety $R^1$. When emulsifier mixtures of a plurality of emulsifiers (E) and/or (EQ) are used, preferably more than 50 mol %, particularly preferably more than 70 mol % of the moieties $R^1$ contain carbon-carbon multiple bonds, wherein carbon-carbon double bonds are particularly preferable. For the above-mentioned cardanol derivatives, this means that in the moiety $R=C_{15}H_{31-2n}$, preferably n=1 to 3 in more than 50 mol %, particularly preferably more than 70 mol % of the moieties R, and n=0 in the remaining moieties R. It is also possible, however, to use emulsifier mixtures that are composed only of those emulsifiers (E) and/or (EQ) with which n=1 to 3, or those with which n=0.

In the primary dispersion to be used according to the invention, the emulsifiers (E) and (EQ) are preferably in an amount of 1 to 10 wt. %, particularly preferably an amount of 2 to 8 wt. %, and very particularly preferably in an amount of 3 to 6 wt. %, each based on the weight of one liter of the dispersion.

Pigments and Fillers

In principle, all inorganic and organic pigments and fillers can be used as pigments and fillers. The pigments and fillers are usually selected in relation to the intended purpose of the pigment- and/or filler-containing formulation. If the formulation is used, for example, for the pigmentation of cathodic electrocoats, which are known to have an acidic pH value, then, for example, no chalk pigments or chalk fillers (calcium carbonate) are eligible for the formulations, because these would dissolve completely in the acidic medium. However, partial dissolution of pigments in the subsequent coating agent may even be desired if, for example, catalytically active metal ions are slowly and gradually released thereby.

Typical inorganic pigments are: oxide and oxide-hydroxide pigments, such as, for example, titanium dioxide, zinc oxide, iron oxide, and chromium oxide; oxide mixed-phase pigments, such as, for example, bismuth-molybdenum-vanadium-oxide yellow, chromium titanium yellow, spinel blue, iron manganese brown, zinc iron brown, iron manganese black, and spinel black; sulfide and sulfide selenide pigments, such as, for example, zinc sulfide, lithopone, cadmium yellow, and cadmium red; carbonate pigments, such as calcium carbonate (with the above-mentioned technical limitation); chromate and chromate-molybdenum mixed-phase pigments, such as, for example, chrome yellow and molybdenum orange and red; complex salt pigments, such as, for example, iron blue; silicate pigments, such as, for example, aluminum silicate and ultramarine (blue, violet, and red); pigments made from chemical elements, such as, for example, aluminum, copper-zinc alloys, and carbon black; as well as other pigments, such as, for example, barium sulfate.

Typical organic pigments are monoazo pigments, disazo pigments, and polycyclic pigments such as, for example, perylene pigments and phthalocyanine pigments.

Typical inorganic fillers are: silicates, such as, for example, talc and kaolin; silicic acids, such as, for example, precipitated or pyrogenic silicic acids; oxides, such as, for example, aluminum hydroxide or magnesium hydroxide; sulfates, such as, for example, blanc fixe; and calcium sulfates, as well as a variety of carbonates.

Pigments and fillers here also encompass those poorly-soluble compounds that are also able to perform catalytic tasks, in addition to the typical tasks of pigments and fillers. It is thus particularly preferable—in particular, with the use of the pigment- and/or filler-containing formulations to produce electrocoats—for poorly-soluble bismuth compounds that catalyze the cross-linking reaction between the main binder and the cross-linkers to be incorporated as pigments. Typical representatives of poorly-soluble bismuth compounds are, for example, bismuth subnitrate and bismuth subsalicylate. To the aqueous preparations that can be obtained with the use of pigment- and/or filler-containing formulations and that include poorly-soluble bismuth compounds, it is possible to add complexing agents such as, for example, EDTA, bicine, or the like, in order to produce successive soluble bismuth.

A sharp distinction between pigments and fillers is not necessary in the present invention. In practice, the refractive index is often used to make a distinction. Pigments are generally said to have a refractive index above 1.7, whereas fillers have a lower one.

Wetting agents and/or dispersants may also be added to the primary dispersions in order to achieve a more favorable dispersibility of the pigments and fillers in the primary dispersions, as may cosolvents, in particular, monoalcohols or glycols.

Cross-Linking Agents (V)

Primary dispersions and coating materials that can be used very particularly advantageously result when the monomers (A) and the at least one emulsifier (E) or (EQ) are (co)polymerized in the presence of at least one hydrophobic—i.e., substantially water-insoluble—cross-linking agent (herein also called a cross-linker). In a further development of the pigment- and/or filler-containing formulations, the cross-linking agents may also be mixed with the primary dispersions or the pigment- and/or filler-containing formulations at a later time.

Preferably, the substantially water-insoluble cross-linking agents contain the previously-described reactive functional groups (a) or (b), which undergo cross-linking reactions with the complementary reactive functional groups (a) or (b) present in the resulting (co)polymerizates and/or the emulsifier(s) (E) and/or (EQ). The resulting primary dispersions contain the cross-linking agents in a particularly favorable distribution, causing the cross-linking reactions to run particularly favorably, so that less cross-linking agent can be used than in the corresponding dispersions that have been manufactured according to methods of the prior art.

Examples of particularly suitable hydrophobic—i.e., substantially water-insoluble—cross-linking agents are blocked polyisocyanates, tris(alkoxycarbonylamino) triazines, or fully etherified aminoplast resins; blocked polyisocyanates are very particularly suitable.

Blocked Polyisocyanates

Examples of suitable organic polyisocyanates to be blocked are, in particular, the so-called lacquer polyisocyanates having aliphatically, cycloaliphatically, araliphatically, and/or aromatically bonded isocyanate groups. It is preferable to use polyisocyanates having an average of 2 to 5, particularly preferably 2.5 to 5 isocyanate groups per molecule.

Examples of particularly suitable polyisocyanates to be blocked are polyisocyanates having isocyanurate, biuret, allophanate, iminooxadiazindione, urethane, urea, and/or uretdione groups.

Polyisocyanates having urethane groups are obtained, for example, by reacting a part of the isocyanate groups with polyols such as, for example, trimethylolpropane and glycerol. If, for example, trimethylolpropane is reacted with 3 equivalents of a diisocyanate, the result is essentially a triisocyanate.

To produce the polyisocyanates to be blocked, it is preferable to use: aliphatic or cycloaliphatic diisocyanates, in particular, hexamethylene diisocyanate, isophorone diisocyanate, dicyclohexylmethane-2,4'-diisocyanate, dicyclohexylmethane-4,4'-diisocyanate, diphenylmethane-2,4'-diisocyanate, diphenylmethane-4,4'-diisocyanate, toluene-2,4-diisocyanate, and toluene-2,6-diisocyanate; diisocyanates derived from dimer fatty acids, such as are marked by the company Henkel under the trade name DDI 1410 and are described in patent documents WO 97/49745 and WO 97/49747, in particular, 2-heptyl-3,4-bis (9-isocyanatononyl)-1-pentyl-cyclohexane; or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl) cyclohexane, or 1,2-, 1,4- or 1,3-Bis(4-isocyanatobut-1-yl) cyclohexane, 1,8-diisocyanato-4-isocyanatomethyl-octane, 1,7-diisocyanato-4-isocyanatomethylheptane, or 1-isocyanato-2-(3-isocyanatopropyl)cyclohexane, or mixtures thereof.

The diisocyanates may also be used as such to produce blocked diisocyanates. Preferably, however, they are not used alone, but rather in the mixture with the polyisocyanates that have on average more than two isocyanate groups.

Very particularly preferable are mixtures of uretdione and/or isocyanurate group- and/or allophanate group-having polyisocyanates based on diphenylmethane-2,4'-diisocyanate, diphenylmethane-4,4'-diisocyanate, toluene-2,4-diisocyanate, and/or toluene-2,6-diisocyanate, as well as the adducts of the above diisocyanates with polyols, in particular, triols, such as, for example, trimethylolpropane and glycerol.

Examples of suitable blocking agents for producing the blocked diisocyanates or polyisocyanates are the blocking agents disclosed in US patent document U.S. Pat. No. 4,444,954, such as, for example:

b1) phenols, such as phenol, cresol, xylenol, nitrophenol, chlorophenol, ethyl phenol, t-butylphenol, hydroxybenzoic acid, hydroxybenzoic acid esters, or 2,5-di-t-butyl-4-hydroxy toluene;

b2) lactams, such as ε-caprolactam, δ-valerolactam, γ-butyrolactam, or β-propiolactam;

b3) active methylene compounds, such as diethyl malonate, dimethyl malonate, ethyl acetoacetate, methyl acetoacetate, or acetyl acetone;

b4) alcohols, such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, butyl diglycol, propylene glycol, diethylene glycol monomethyl ether, diethylene glycol monoethyl ether, propylene glycol monomethyl ether, methoxymethanol, glycolic acid, glycolic acid esters, lactic acid, lactic acid esters, methylol urea, methylol melamine, diacetone alcohol, ethylene chlorohydrine, ethylene bromohydrine, 1,3-dichloro-2-propanol, 1,4-cyclohexyldimethanol, or acetocyanhydrine;

b5) mercaptans, such as butyl mercaptan, hexyl mercaptan, t-butyl mercaptan, t-dodecyl mercaptan, 2-mercapto-benzothiazole, thiophenol, methyl thiophenol, or ethyl thiophenol;

b6) acid amides, such as acetoanilide, acetoanisidine amide, acrylamide, methacrylamide, acetic amide, stearic amide, or benzamide;

b7) imides, such as succinimide, phthalimide, or maleimide;

b8) amines, such as diphenylamine, phenylnaphthylamine, xylidine, N-phenyl xylidine, carbazole, aniline, naphthylamine, butylamine, dibutylamine, or butyl phenylamine;

b9) imidazoles, such as imidazole or 2-ethylimidazole;

b10) ureas, such as urea, thiourea, ethylene urea, ethylene thiourea, or 1,3-diphenyl urea;

b11) carbamates, such as N-phenyl carbamic acid phenyl ester or 2-oxazolidone;

b12) imines, such as ethylene imine;

b13) oximes, such as formaldoxime, acetaldoxime, acetoxime, methylethyl ketoxime, diisobutyl ketoxime, diacetylmonoxime, benzophenonoxime, or chlorohexanonoxime;

b14) sulfurous acid salts, such as sodium bisulfite or potassium bisulfite;

b15) hydroxamic acid esters, such as benzyl methacrylo hydroxamate (BMH) or allyl methacrylo hydroxamate;

b16) substituted pyrazoles, in particular, dimethylpyrazole or triazole; and b17) mixtures of the above-mentioned blocking agents.

Aminoplast Resins

Examples of suitable, fully etherified aminoplast resins are melamine resins, guanamine resins, or urea resins. Also applicable are the usual and known aminoplast resins in which methylol and/or methoxymethyl groups have been partially defunctionalized by means of carbamate or allophanate groups. Cross-linking agents of this type are described in patent documents U.S. Pat. No. 4,710,542 A1 and EP 0 245 700 B1, as well as in the article by B. Singh et al. "Carbamylmethylated Melamines, Novel Crosslinkers for the Coatings Industry" in Advanced Organic Coatings Science and Technology Series, 1991, vol. 13, pp. 193-207.

Tris(alkoxycarbonylamino) triazines

Suitable tris(alkoxycarbonylamino) triazines are described, for example, in patent documents U.S. Pat. No. 4,939,213 A1, U.S. Pat. No. 5,084,541 A1, or EP 0624577 A1. In particular, tris (methoxy-, tris(butoxy-, and/or tris(2-ethylhexoxycarbonylamino) triazines may be used.

From the above-described cross-linking agents, the blocked polyisocyanates offer special advantages and are therefore very particularly preferably used according to the invention.

The ratio of monomers (A) containing complementary reactive functional groups (a) or (b) to the cross-linking agents can vary widely. According to the invention, it is advantageous when the molar ratio of complementary reactive function groups (a) or (b) in (A) to complementary reactive functional groups (a) or (b) in the cross-linking agents is 5:1 to 1:5, preferably 4:1 to 1:4, particularly preferably 3:1 to 1:3, and in particular 2:1 to 1:2. Particular benefits arise when the molar ratio is about or exactly 1:1.

Other Components of the Primary Dispersions

The other components of the primary dispersions to be used according to the invention can be divided into those that are used to control and perform the method for producing the primary dispersions—such as, for example, initiators for the free-radical emulsion polymerization—or compounds that can control the molecular weight of the polymers—such as, for example, mercaptans, in particular, dodecyl mercaptan—and those that optimize the characteristic profile of the primary dispersions with respect to the later area of application.

Initiators of the Free-Radical Emulsion Polymerization

The monomers (A) to be used according to the invention and optionally polymerizable emulsifiers (E) or (EQ) are generally reacted with one another into copolymerizates in the presence of at least one water- and/or oil-soluble free radical-forming initiator. Examples of available initiators are: Dialkyl peroxides such as di-tert-butyl peroxide or dicumyl peroxide; hydroperoxides such as cumene hydroperoxide or tert-butyl hydroperoxide; peresters, such as tert-butyl perbenzoate, tert-butylperpivalate, tert-butylper-3,5,5-trimethylhexanoate, or tert-butylper-2-ethylhexanoate; peroxodicarbonates such as bis(4-tert-butylcyclohexyl) peroxydicarbonate; potassium, sodium or ammonium peroxodisulfate; azo initiators, examples being azo dinitriles such as azobisisobutyronitrile; initiators such benzopinacol silyl ether; or a combination of a non-oxidizing initiator with hydrogen peroxide.

Other examples of suitable initiators are described in German patent application DE 196 28 142 A1 (p. 3, line 49 to p. 4, line 6). It is also possible to use combinations of these initiators.

Preferably, the proportion of the initiator in the reaction mixture, each with respect to the total amount of monomers (A) and the initiator, is 0.1 to 1.5 wt. %, particularly preferably 0.2 to 1.0 wt. %, and very particularly preferably 0.3 to 0.7 wt. %.

Molecular Weight Regulators

As molecular weight regulators, preferably water-insoluble molecular weight regulators can be used. Particularly suitable are mercaptans such as, for example, tert-dodecyl mercaptan.

Other Components Determining the Property Profile of the Primary Dispersion

Examples of other components of the primary dispersion that can be used are water-insoluble low-molecular, oligomeric, or polymeric substances. Examples of suitable hydrophobic compounds are oligomeric and/or polymeric polymerization products, polycondensation products, and/or polyaddition products. In particular, it is possible to use polymers that are adapted to the subsequent use of the pigment- and/or filler-containing formulation, in a particular type of coating agent. Thus, it is possible to incorporate for, e.g., epoxy amine adducts, such as are usually used in coating agents, in particular, electrocoats, to be incorporated before or during the polymerization. Particular preferable are those epoxy amine adducts that contain quaternary nitrogen atoms; these can be obtained by reacting epoxy groups of the epoxy amine resin with ammonium salts of the general formula $HN^{\oplus}(R^2)(R^3)(R^4)(X^{\ominus})$—analogously to the production of (EQ). The definitions of the moieties $R^2$, $R^3$, $R^4$, and $X^{\ominus}$ correspond to the definitions for the formula (EQ). Additionally or alternatively to the epoxy amine adducts, it is also possible to use acrylate resins that are different from the primary dispersion particles. Among the acrylate resins, those with quaternary nitrogen atoms are preferable.

The production of the miniemulsion used in the context of the method according to the invention has no methodological particularities, but rather is performed according to common and known methods for dispersing or emulsifying in a high shear field. Examples of suitable methods are described in patent documents DE 196 28 142 A1 (p. 5, lines 1 to 30), DE 196 28 143 A1 (p. 7, lines 30 to 58), or EP0 401 565 A1 (lines 27 to 51).

Thus, preferably, first there is produced a mixture of one or more monomers (A) with at least one emulsifier (E) and/or (EQ), optionally one molecular weight regulator, and optionally at least one cross-linking agent (A), as well as optionally other components, such as are described above—e.g., epoxy amine resins, cosolvents, and the like. The mixture is optionally at least partially neutralized with an acid, preferably a carboxylic acid such as formic acid or lactic acid, and vigorously stirred until a crude emulsion is formed.

Next, with the introduction of high shear forces—optionally, under pressure—miniemulsion that is as homogeneous as possible and not yet polymerized is generated by means of a homogenizer, preferably a high-pressure homogenizer.

The polymerization takes place next in a suitable reactor. Conceivable reactors for the (co)polymerization process are the common and known stirred vessels, cascades of stirred vessels, tubular reactors, loop reactors, or Taylor reactors, such as are described, for example, in patent documents DE 1071241 B1 or EP 0498583 A1, or in the article by K. Kataoka in Chemical Engineering Science, vol. 50, issue 9, 1995, pp. 1409-1416. Preferably, the free-radical copolymerization is performed in stirred vessels or Taylor reactors, wherein the Taylor reactors are designed so as to fulfil the conditions for Taylor flow over the entire reactor length, even if the kinematic viscosity of the reaction medium varies significantly—in particular, increases—due to the copolymerization.

The copolymerization is carried out in an aqueous medium. Herein, beyond the emulsifiers, optional cross-linking agents, optional hydrophobic compounds, and optional protective colloids described in detail above, the aqueous medium may also contain common and known lacquer additives and/or other solid, liquid, or gaseous organic and/or inorganic low- or high-molecular materials, provided that these do not negatively affect or even inhibit the (co)polymerization.

In the framework of the present invention, the term "minor amount" is to be understood to mean an amount that does not eliminate the aqueous character of the aqueous medium.

The aqueous medium may, however, even entail pure water.

The (co)polymerization is advantageously performed at temperatures above room temperature (25° C.), wherein it is preferable to select a temperature range of 25° C. to 95° C., very particularly preferably 30° C. to 90° C. Preferably, the polymerization is done under a protective gas atmosphere, in particular, a nitrogen atmosphere.

With the use of particularly light volatile monomers (A), it is also possible to perform the (co)polymerization under pressure, preferably under 1.5 to 3000 bar, particularly preferably 5 to 1500 bar, and in particular 10 to 1000 bar. Here, higher temperatures than 95° C. can also be used in certain cases.

The polymerization is commonly activated and triggered by water-soluble initiators. Examples of suitable initiators are sodium, potassium, and ammonium persulfate, or tert-butylhydroperoxide. It is particularly preferable to use tert-butylhydroperoxide, which can be activated, for example, by catalytic amounts of iron (II) ions. This results in hydroxide ions and tert-butoxide radicals. The iron (III) ions formed can be reduced back to iron (II) ions by a reducing agent. Sodium formaldehyde sulfoxylate is an example of a suitable reducing agent. With high levels of residual monomers, it may be necessary to perform a post-polymerization by again adding additional amounts of initiator.

Here, the method proves particularly advantageous in that it can also be performed in a batchwise manner. In addition, the procedures described in German patent application DE 19628142 A1 (p. 4, lines 6 to 36) may also be used.

Dispersing the Pigment- and/or Filler-Containing Formulation

In the framework of the method for producing pigment- and/or filler-containing formulations according to the invention, the pigments and/or fillers are mixed with the primary dispersion. The mixing is accompanied by dispersion of the pigments and/or fillers and has the aim of obtaining dispersions that have the highest possible proportion of pigment and/or filler primary particles.

The mixing thus serves to largely homogeneously disperse the pigments and/or fillers in the primary dispersion. Simply stirring then destroys so-called conglomerates, i.e., loose conglomerations of pigment and/or filler agglomerates. Breaking up the agglomerates, i.e., spatially cohering pigment and/or filler aggregates, often requires higher shear forces. The aggregates, which are made of pigment primary particles that cohere tightly together due to surface forces, are in turn generally only crushed by strong shear forces. The aim of the dispersion process is to disperse the pigments and/or fillers used to the extent that the highest possible proportion of primary particles, i.e., individual pigment particles is produced. A graphic comparison of primary particles, aggregates, and agglomerates can be found, for example, in DIN 53206 (sheet 1). The term "crushing"—as used herein—is to break up conglomerates, agglomerates, and/or aggregates, rather than further crushing of primary particles.

In order to mix and disperse the pigments and/or fillers in the gentlest manner possible, it is common to perform a multi-stage mixing with the application of ever-higher shear forces.

It is advisable to first mix the primary dispersion with the solids to be incorporated, in particular, the pigments and/or fillers, by simple stirring. In an advantageous embodiment, one or more adjuvants—in particular, wetting agents and/or dispersants and/or organic solvents—may be added to the primary dispersion before or during the stirring. There are a number of solvents that promote the dispersion; these include, in particular, monoalcohols and glycols. Wetting agents are successfully used, in particular, with some poorly-wettable organic pigments.

Preferably, there is a subsequent predispersion by means of a so-called dissolver, which herein entails high-speed disc agitators. The predispersion typically serves to achieve higher throughput for the ensuing main dispersing aggregates. With readily-dispersible pigments, such as, for example, titanium dioxide pigments, however, a predispersion may be omitted entirely. The predispersion turns coarsely-dispersed systems into so-called colloidal dispersed systems, which are characterized in that the solid particles do not settle under the influence of gravity, due to the small size thereof. The predispersion involves wetting of the surface of the solid particles, through the liquid medium, and a partial mechanical crushing of the conglomerates, agglomerates, and aggregates into smaller particles. The preferred use of wetting agents and/or dispersants during the predispersion also results in stabilization of the smaller particles against reagglomeration.

Dissolvers can be used not only for predispersion, but also to incorporate matting agents at lower shear rates, or—in some cases—for the main dispersion at higher shear rates.

Typical operational data for incorporating matting agents are circumferential speeds of 10 to 20 m/s, such as, for example, 16 m/s, with dispersion times of 5 to 10 min and temperatures from room temperature (25° C.) to 35°. The circumferential speed is calculated from the disc circumference of the disc agitator, and the number of revolutions per unit time. Common circumferential speeds for the predispersion lie about 5 m/s higher, at 15 to 25 m/s, such as, for example, 21 m/s, with dispersion times of 10 to 20 min and temperatures in the range of 35° C. to 50° C. If dissolvers are also used for the main dispersion, then the circumferential speeds lie again about 5 m/s higher than with the predispersion, for example, in a range from 20 to 30 m/s, such as, for example, 25 m/s, with dispersion times in the range of 20 to 40 min and temperatures in the range of 50° C. to 70° C. The above-mentioned values may be viewed as a general guide; the ranges preferably apply for batch sizes of 500 to 1000 kg.

Different types of dissolvers are described in detail with the corresponding typical operational data therefor in the laboratory "Lehrbuch der Lacke and Beschichtungen", vol. 8, 2004, pp. 47-50.

For particularly high-quality color-pigmented lacquers, dispersion with a dissolver is not necessarily sufficient in all cases. The main dispersion is then performed, for example, in so-called triple rollers, bead mills, or agitator mills. Bead mills and especially agitator mills are particularly suitable thereamong. All three aforementioned types of mills are described in detail with the corresponding typical operational data therefor in the laboratory "Lehrbuch der Lacke und Beschichtungen", vol. 8, 2004, p. 53ff.

The state of dispersion of the pigment- and/or filler-containing formulations according to the invention can be determined by ascertaining the grindometer value. This entails a simple determination of the fineness of the ground material, wherein the proportion of so-called large grain is measured. The measurement and assessment methods are explained in greater detail in the examples, and correspond to DIN 53203.

Pigment- and/or Filler-Containing Formulations

Another subject matter of the present invention is the pigment- and/or filler-containing formulations obtainable by the production method according to the invention. These are also often called pigment preparations, pigment pastes, or ground materials in the literature.

Dispersing 100 g of a pigment or filler in a dissolver typically requires 30 to 1000 g of binder, depending on the nature of the pigment or filler. Whereas, for example, titanium dioxide disperses very well in small quantities of binders, for example, 40 to 60 g of binder to 100 g of titanium dioxide, dispersing certain silicic acids such as, for example, certain Aerosils requires up to 900 g of binder per 100 g of Aerosil. Relevant information is available in Römpp Lexikon Lacke und Druckfarben, 1998, p. 369, keyword "Mahlgut" ("ground material").

Aqueous Preparations Containing the Pigment- and/or Filler-Containing Formulations The pigment- and/or filler-containing formulations according to the invention are used to produce aqueous preparations, in particular, to produce coating materials. Further subject matters of the present invention are thus aqueous preparations, in particular, coating agent compositions, that contain the pigment- and/or filler-containing formulations according to the invention.

The aqueous preparations according to the invention are preferably pigmented coating agent compositions, very particularly preferably cathodically depositable electrocoats. For these intended uses, at least one common lacquer additive in effective quantities can be added to the primary dispersions to be used according to the invention, before, during, and/or after the production thereof. A person skilled in the art will be able to identify such lacquer additives, on the basis of common general knowledge. Preferably, the aforementioned lacquer additives are added after the production of the primary dispersions.

Examples of suitable additives are thermally curable reactive diluents, low-boiling and/or high-boiling organic solvents, UV absorbers, light stabilizers, radical scavengers, thermolabile radical initiators, catalysts for the cross-linking, venting means, slip additives, polymerization inhibitors, antifoaming agents, emulsifiers, wetting agents, bonding agents, leveling agents, film-forming additives, rheology-controlling additives, or flame retardants. Other examples of suitable lacquer additives are described in the textbook "Lackadditive" by Johan Bieleman, Wiley-VCH, Weinheim, N.Y., 1998.

Should the aqueous preparations—in particular, coating materials—according to the invention also be curable with actinic radiation (dual cure), they preferably contain additives that are curable with actinic radiation. Actinic radiation may entail electromagnetic radiation, such as near-infrared (NIR), visible light, UV light, or X-rays, or corpuscular radiation, such as electron radiation. Examples of suitable additives that are curable with actinic radiation are disclosed in German patent DE 197 09 467 C1.

Methodologically, the application of the aqueous preparations according to the invention—in particular, the coating materials—does not have any particularities, but rather can take place through all of the common application methods, such as spraying, blade spreading, brushing, pouring, dipping, or rolling, or by means of electrocoating, in particular, cathodic electrocoating.

Substrates that can be used include all surfaces to be lacquered that are not damaged by curing of the lacquer located thereon with the use of heat and optionally the use of actinic radiation; these are, in particular, metals, plastics, wood, ceramic, stone, textiles, fiber composites, leather, glass, glass fibers, glass and rock wool, mineral- and resin-bonded building materials, such as gypsum and cement panels or roof tiles, as well as composites of these materials. Thus, the coating material according to the invention is also suitable for uses beyond automotive painting. Container coating and the impregnation or coating of electrical components are particularly relevant here for the painting of furniture and industrial painting, including coil coating. In the context of industrial painting, it is suitable for painting practically all of the parts for private or industrial use such as radiators, household appliances, small parts made of metal such as screws and nuts, hubcaps, wheels, packaging, or electrical components such as motor windings or transformer windings.

In the case of electrically conductive substrates, the aqueous preparations according to the invention or the coating agent compositions according to the invention may preferably be applied by means of electrocoating, particularly preferably by means of cathodic electrocoating.

Another subject matter of the present invention is therefore an electrocoating composition (also called an electrocoat, for brevity), which comprises the pigment- and/or filler-containing formulations according to the invention. Such an electrocoat composition is particularly suitable for cathodic electrocoating. Another subject matter of the present invention is thus the use of the pigment- and/or filler-containing formulations according to the invention in electrocoat compositions, in particular, cathodically depositable electrocoat compositions.

The electrocoats according to the invention preferably have a solids content of 5 to 50 mass %, preferably 5 to 35 mass %. Here, solids are understood to be the component of an electrocoat that remain after drying at 180° C. for 30 min.

As a binder, the electrocoats according to the invention contain at least the dispersed polymer particles preferably contained in the pigment- and/or filler-containing formulations according to the invention, as well as the emulsifiers (E) or (EQ) used to produce the primary dispersions, the state thereof being either free or copolymerized into the polymer particles. The term "binder" refers herein, in accordance with EN ISO 4618:2006 (German edition), to the non-volatile fraction of a pigment- and/or filler-containing formulation or of a coating agent such as, for example, an electrocoat, less the fillers and pigments included therein.

Preferably, the dispersed polymer particles that are contained in the pigment- and/or filler-containing formulations according to the invention contain reactive functional groups that can undergo thermal cross-linking reactions with the complementary reactive functional groups present in the above-mentioned cross-linking agents. Previously mentioned examples of suitable reactive functional groups are hydroxy groups, thiol groups, and primary and secondary amino groups, in particular, hydroxy groups.

Particularly preferably, the polymer particles contained in the primary dispersions used according to the invention contain at least one type of cationic and/or potentially cationic groups, which may be copolymerized, for example, through use of the emulsifiers (E) or (EQ) bearing carbon-carbon multiple bonds or the monomers a2). Potentially cationic groups are, for example, initially uncharged primary, secondary, or tertiary amino groups that can be transformed into ammonium groups by protonation with inorganic or preferably organic acids. Because cathodic electrocoats usually have a pH value of 4.5 to 6.5, which is usually adjusted by adding acids, the pH value of the electrocoats is generally sufficient to convert potentially cationic groups into cationic groups. Examples of suitable acids for the potentially cationic groups are organic and inorganic acids such as sulfuric acid, phosphoric acid, formic acid, acetic acid, lactic acid, propionic acid, α-methylolpropionic acid, dimethylolpropionic acid, γ-hydroxypropionic acid, glycolic acid, tartaric acid, malic acid, citric acid, sugar acids, salicylic acid, 2,4-dihydroxybenzoic acid, or sulfonic acids, such as amidosulfonic acids and alkanesulfonic acids, such as methanesulfonic acid, in particular formic acid, acetic acid, or lactic acid. The use of hydrochloric acid is not preferred, and is precluded in a preferred embodiment.

Other examples of potentially cationic groups that can be converted into cations by neutralizing agents and/or quaternizing agents are secondary sulfide groups or tertiary phosphine groups. Tertiary amino groups, as they occur, in particular, in the emulsifiers (E) are particularly preferable.

Examples of suitable cationic groups are quaternary ammonium groups, tertiary sulfonium groups, or quaternary phosphonium groups, preferably quaternary ammonium groups or tertiary sulfonium groups, but in particular quaternary ammonium groups, such as they occur, in particular, in the emulsifiers (EQ).

In addition to the compulsorily-contained polymer particles of the primary dispersions, other binders typical for electrocoats may also be contained in the electrocoat according to the invention. Other binders for electrocoats are disclosed in documents EP 0 082 291 A1, EP 0 234 395 A1, EP 0 227 975 A1, EP 0 178 531 A1, EP 0 333 327, EP 0 310 971 A1, EP 0 456 270 A1, U.S. Pat. No. 3,922,253 A, EP 0 261 385 A1, EP 0 245 786 A1, EP 0 414 199 A1, EP 0 476 514 A1, EP 0 817 684 A1, EP 0 639 660 A1, EP 0 595 186 A1, DE 41 26 476 A1, WO 98/33835, DE 33 00 570 A1, DE 37 38 220 A1, DE 35 18 732 A1, or DE 196 18 379 A1. This preferably involves resins that contain primary, secondary, tertiary, or quaternary amino or ammonium groups, and/or tertiary sulfonium groups and have amine numbers between 20 and 250 mg KOH/g and a weight-average molecular weight of 300 to 10000 Dalton. In particular, amino (meth)acrylate resins, amino epoxy resins, aminopolyurethane resins, amino group-containing polybutadiene resins, or modified epoxy resin/carbon dioxide/amine reaction products are used. Very particularly preferred epoxy amine resins are those disclosed in WO-A-2004/007443 and also resins used in the experimental part of the present invention.

Relevant as cross-linking agents are all of the usual and known cross-linking agents that contain suitable complementary reactive functional groups. Preferably, the cross-linking agents are selected from the above-described set of cross-linking agents.

The aqueous preparations according to the invention—in particular, the electrocoats—preferably contain metal compounds in which the metal is present in the form of a cation, very particularly preferably, bismuth compounds. Such metal compounds and, in particular, bismuth compounds are thus very particularly preferably contained when the emulsifiers (E) or (EQ) contained according to the invention bear a hydroxy group, thiol group, or primary or secondary amino group in the beta position to the nitrogen atom in the general formula of the emulsifiers (E) or (EQ). The aforementioned groups located in the beta position are beneficial for the cross-linking density of the coating. Preferably, the aqueous preparations—in particular, the cathodically depositable electrocoats—contain at least 30 ppm, particularly preferably at least 100 ppm, very particularly preferably at least 200 ppm, and in particular at least 250 ppm bismuth in dissolved form, based on the total weight of the aqueous preparation The content of the dissolved bismuth should preferably not exceed 20000, and particularly preferably not exceed 10000 ppm. In addition or alternatively to the dissolved bismuth, it shall be readily understood that the bismuth pigments set forth above can be used.

Moreover, the aqueous preparations—in particular, the electrocoats—according to the invention contain at least one common and well-known additive, selected from the group of additives described in general terms above, in effective amounts.

The aqueous preparations—in particular, the electrocoats—according to the invention are produced by mixing the aforementioned components. The components may be homogenized. Optionally, the electrocoats according to the invention may be produced with the aid of common and known mixing processing and devices such as stirring vessels, agitator bead mills, extruders, kneaders, Ultra-Turrax apparatuses, Inline dissolvers, static mixers, micromixers, gear rim dispersers, pressure relaxation nozzles, and/or microfluidizers.

The aqueous preparations—in particular, the electrocoats—according to the invention are used, in particular, for cathodic dip coating. The aqueous preparations—in particular, the electrocoats—according to the invention may usually be cathodically deposited on electrically conductive substrates, e.g., substrates that are electrically conductive or made to be conductive, for example, plastic substrates that have been made to be electrically conductive by metallization, or, in particular, metallic substrates.

The invention therefore also relates to a method for cathodically depositing the aqueous preparations—in particular, the electrocoats—according to the invention on such substrates. The method has no methodological particularities. In addition, the electrocoats according to the invention can be used to produce primer coatings by cathodic dip coating of substrates with electrically conductive surfaces.

As metallic substrates, it is possible to use parts made of all of the common metals, for example, the metal parts that are common in the automotive industry, in particular, automotive bodies and parts thereof. Thus, the electrocoats according to the invention can also be used in the painting of vehicles or parts thereof. Very particularly preferred substrates are aluminum substrates. The substrates may be pre-treated by applying a conversion layer—for example, the substrates may be phosphated or chromated. In a preferred embodiment of the invention, the substrates are neither phosphated nor chromated.

In the cathodic deposition of the aqueous compositions, the substrate is dipped in the aqueous composition and connected as a cathode. Preferably, the deposition of the aqueous composition takes place in at least two stages, wherein a voltage in the range of 1 to 50 V is applied in a first stage and a voltage of 50 to 400 V is applied in a second stage, under the condition that in the second stage, the voltage lies at least 10 V above the voltage of the first stage. The voltage is maintained in each stage preferably for at least 10 seconds until at most 300 seconds. Aluminum substrates are preferably used as substrates.

Prior to the curing of the coating, the cathodic deposition may be followed by other treatment stages, such as, for example, rinsing with water and/or ultrafiltrate or, in a particular preferred embodiment of the invention, a so-called sol-gel post-rinsing with a sol-gel composition.

A person skilled in the art will know the terms "sol-gel composition" and "sol-gel", as well as the production of sol-gel compositions and sol-gels, for example, from D. Wang et al., Progress in Organic Coatings 2009, 64, 327-338 oder S. Zheng et al., J. Sol-Gel. Sei. Technol. 2010, 54, 174-187.

An aqueous "sol-gel composition" in the sense of the present invention is preferably understood to be an aqueous composition for the production of which at least one starting compound is reacted with water by hydrolysis and condensation, the starting compound having at least one metal atom and/or semi-metal atom such as, for example, $M^1$ and/or $M^2$ and at least two hydrolyzable groups such as, for example, two hydrolyzable groups $X^1$, and the starting compound optionally further having at least one non-hydrolyzable organic moiety such as, for example, $R^1$. The at least two hydrolyzable groups are preferably each directly bonded by means of a single bond to the at least one metal atom and/or at least one semi-metal atom contained in the at least one starting compound. Due to the presence of the non-hydrolyzable organic moiety, such as, for example, $R^1$, such a sol-gel composition used according to the invention may also be called a "sol-gel-hybrid composition".

Preferably, the aqueous sol-gel composition that can be used according to the invention in the optional sol-gel rinsing step is obtainable by reacting at least one compound $Si(X^1)_3(R^1)$,
wherein $R^1$ stands therein for a non-hydrolyzable organic moiety comprising at least one reactive functional group selected from the group consisting of primary amino groups, secondary amino groups, epoxy groups, and groups that have an ethylenically unsaturated double bond;
in particular, at least one compound $Si(X^1)_3(R^1)$, wherein $R^1$ stands therein for a non-hydrolyzable organic moiety that has at least one epoxy group as a reactive functional group, and where $X^1$ stands for a hydrolyzable group such as, for example, an O—$C_{1-6}$ alkyl group, and additionally
optionally at least one other compound $Si(X^1)_3(R^1)$, wherein $R^1$ stands therein for a non-hydrolyzable organic moiety having at least one reactive functional group selected from the group consisting of primary amino groups and secondary amino groups, and where $X^1$ stands for a hydrolyzable group such as, for example, an O—$C_{1-6}$ alkyl group,
and optionally at least one compound $Si(X^1)_4$, where $X^1$ stands for a hydrolyzable group such as, for example, an O—$C_{1-6}$ alkyl group,
and optionally at least one compound $Si(X^1)_3(R^1)$, wherein $R^1$ stands therein for a non-hydrolyzable organic moiety that has no reactive functional group, such as, for example, a $C_{1-10}$ alkyl moiety, and where $X^1$ stands for a hydrolyzable group such as, for example, an O—$C_{1-6}$ alkyl group,
and optionally at least one compound $Zr(X^1)_4$, where $X^1$ stands for a hydrolyzable group such as, for example, an O—$C_{1-6}$ alkyl group,
with water.

Even the curing of the applied coating materials or electrocoats according to the invention has no methodological particularities, but takes place after the common and known thermal methods, such as heating in a convection oven or irradiation with IR rays, which can be added in the case of dual cure through exposure to actinic radiation. Here, it is possible to use radiation sources such as mercury high-pressure or low-pressure steam lamps, which are optionally doped with lead, in order to open a radiation window up to 405 nm, or electron beam sources.

The electrically conductive substrates coated with a cathodic electrocoat layer, which are also a subject matter of the present invention, can be coated with one or more other paint layers such as, for example, one or more filler paint layers, one or more base paint layers, and/or one or more clear coating layers. Such multicoat paint structures are known, in particular, in automotive painting. In other fields, however, it may suffice simply to apply an electrocoat layer according to the invention.

The invention shall be described in greater detail below through examples.

EMBODIMENTS

Unless otherwise specified, information in parts is to be understood to be by weight.

Testing Methods (1) Filiform Corrosion According to DIN EN 3665 (Abbreviated as "Filiform Test")

The determination of filiform corrosion is used to ascertain the corrosion resistance of a coating on a substrate. This determination is made according to DIN EN 3655 (date: 1 Aug. 1997) for the electrically conductive substrate aluminum (ALU) coated with a coating composition according to the invention or with a comparison coating composition, over a duration of 1008 hours. Therein, the respective coating is infiltrated in the form of a linear or filiform undercorrosion originating from a linear breach in the coating. The mean and maximum thread length in [mm] can then be measured according to DIN EN 3665 (method 3), and are a measure of the resistance of the coating against corrosion. The infiltration in [mm] is also determined according to PAPP WT 3102 (Daimler) (date: 21 Dec. 2006).

(2) Grindometer Value Determination According to DIN 53203

Grindometer blocks and scrapers are visually checked for integrity. The grindometer block is placed on a flat, non-slip surface and wiped clean immediately before the test. Then, the sample, which must be free of air bubbles, is applied to the deepest point of the measurement flume and withdrawn with the scraper in about one second, with slight pressure to the flat end of the flume. The reading must be made within 3 seconds; the grindometer block is then held to the light so that the surface structure of the withdrawn coating film can be carefully studied. Then, the read point on the film can be marked with the finder nail; individual stippling or scoring is ignored. The read point is where the particles originating from the paint film begin to cluster together. The viscosity of the probe to be measured should have an approximately "stringy consistency". Freshly dispersed ground material must cool to room temperature (25° C.) before the measurement. If the cold sample is too viscous, it is diluted with the binder contained in the ground material. A thixotropic material is advantageously stirred up prior to the measurement, with one part non-thixotropic binder and one part solvent. If air bubbles are present in the ground material, then the sample is filtered over a 100 μm sieve. A "25er grindometer" is used for grain sizes of 10 to 20 μm, while a "50er grindometer" is used for 15 to 40 μm, and a "100er grindometer" is used for grain sizes of 25 to 100 μm.

Production of the Emulsifier E1:

1417.2 parts cardolite NC 513 (EEW 532 g/eq) is heated to 70° C. with stirring in a reaction vessel equipped with a stirrer, reflux condenser, temperature sensor, nitrogen inlet, and drip funnel. Then, 282.9 parts diethanolamine are added dropwise over 15 minutes. This is followed by stirring until all NH equivalents are reacted and an epoxy amine value (a measure reflective of the amounts of epoxy groups and amino groups together) of 1.57 mmol/g is achieved. Once the mixture has cooled to 30° C., 300 parts 80% lactic acid is slowly added dropwise, and stirred for 30 minutes at room temperature.

Production of the Emulsifier E2:

(a) Production of an Adduct from Diethylenetriamine and ε-Caprolactone 456.0 parts ε-caprolactone is prepared together with 206.0 parts diethylenetriamine in a reaction vessel equipped with a stirrer, reflux condenser, temperature sensor, and nitrogen inlet, and heated to 80° C. under stirring. After four hours, another 50.0 parts ε-caprolactone is added, and stirred for two hours before the temperature is raised to 110° C. This is followed by stirring until all of the primary amine groups have been reacted and an MEQ base value of 2.80 mmol/g has been achieved, though for not less than another three hours.

(b) Production of the Emulsifier E2:

532.0 parts Cardolite NC 513 (EEW 532 g/eq) are heated to 80° C. under stirring with 357.1 the above-produced adduct of diethyleneamine and ε-caprolactone in a reaction vessel equipped with a stirrer, reflux condenser, temperature sensor, and nitrogen inlet, until all of the NH equivalents have been reacted and an epoxy amine value of 1.12 mmol/g has been reached, though for not less than two hours. Then, 93.4 parts 90% lactic acid is added and stirred for 30 minutes at 80° C.

Production of the Emulsifier EQ1:

First of all, a dimethylethanolammonium lactate is produced. This is done by stirring 511.90 parts dimethylethanolamine, 711.9 parts 80% lactic acid, 644.2 parts butyl glycol, and 74.8 parts demineralized water in a reaction vessel equipped with a stirrer and a reflux condenser, for 24 hours.

3057.2 parts cardolite NC 513 (EEW 532 g/eq) is heated to 60° C. with stirring in a reaction vessel equipped with a stirrer, reflux condenser, temperature sensor, nitrogen inlet, and drip funnel. 1942.8 parts the above dimethylethanolamine lactate is then slowly added dropwise over 30 min. The reaction mixture is then stirred until an MEQ acid value (=milliequivalent acid value) of 0.116 mmol/g is reached.

Production of a Grinding Resin R1

Production of the Monomer Mixture 8.0 parts isobornyl methacrylate, 43.0 parts methyl methacrylate, 37.0 parts butyl acrylate, 5.1 parts hydroxyethyl methacrylate, 44.2 parts styrene, 112.0 parts a diglycidyl ether based on bisphenol A (EEW 475 g/eq) (Epikote 1001, product sold by Momentive Speciality Chemicals Inc.), 93.1 parts a polyisocyanate based on a 2,4-toluene diisocyanate-trimethylolpropane adduct blocked with diethylene glycol monobutyl ether (80%) in ethyl acetate, 0.8 parts tert-dodecyl mercaptan, 24.0 parts n-butanol, and 16.0 parts a p-toluenesulfonamide (Ketjenflex 9s, product sold by Axcentive) are stirred in a vessel until there is a solution. Then, 358.5 parts an 11% dispersion of the emulsifier E1 in demineralized water is added slowly together with 1576.8 parts demineralized water under vigorous stirring. The resulting crude emulsion is then stirred for at least another five minutes.

Production of the Miniemulsion:

The crude emulsion is transferred to an apparatus for applying high shear forces, and then twice homogenized passagewise at 600 bar with a high-pressure homogenizer (model 110Y from Microfluidics, equipped with a H230Z and H210Z homogenization chamber).

In-Situ Polymerization of the Miniemulsion:

The miniemulsion is then heated to 75° C. under stirring in a reaction vessel equipped with a stirrer, reflux condenser, temperature sensor, nitrogen inlet, and dosage unit. At 75° C., 0.2 parts a 1% iron (II) sulfate solution is added, and a solution of 1.0 parts sodium formaldehyde sulfoxylate dihydrate in 30.7 parts demineralized water is added dropwise, uniformly over a period of one and a half hours, together with a solution of 1.4 parts a 70% tert-butyl hydroperoxide solution in 26.9 parts demineralized water. This is followed by another hour of stirring at 75° C., before the in-situ polymerized miniemulsion is cooled to room temperature and filtered (nylon filter bag with an 80-μm cut-off).

Particle size (Z-average): 157 nm

PDI: 0.07

Solids (drying for 60 minutes at 105° C.): 33.8%

Production of a Grinding Resin R2

Production of the Monomer Mixture 8.0 parts isobornyl methacrylate, 43.0 parts methyl methacrylate, 37.0 parts butyl acrylate, 5.1 parts hydroxyethyl methacrylate, 44.2 parts styrene, 112.0 parts bisphenol A diglycidyl ether (EEW 186 g/eq) (Araldit GY 2600, product sold by BASF SE), 17.44 parts Super Iso Stable (TDI-trimethylol propane adduct, blocked with 3 equivalents phenol, product sold by Super Urecoat Industries), 0.8 parts tert-dodecyl mercaptan, and 39.9 parts the emulsifier E1 are stirred in a vessel until there is a solution. Then, a solution composed of 25.4 parts diethylaminoethyl methacrylate, 6.3 parts formic acid, and 550.6 parts demineralized water is added slowly under vigorous stirring. The resulting crude emulsion is then stirred for at least another five minutes.

Production of the Miniemulsion:

The crude emulsion is transferred to an apparatus for applying high shear forces, and then twice homogenized passagewise at 600 bar with a high-pressure homogenizer (model 110Y from Microfluidics, equipped with a H230Z and H210Z homogenization chamber).

In-Situ Polymerization of the Miniemulsion:

The miniemulsion is then heated to 75° C. under stirring in a reaction vessel equipped with a stirrer, reflux condenser, temperature sensor, nitrogen inlet, and dosage unit. At 75° C., 0.2 parts a 1% iron (II) sulfate solution is added, and a solution of 1.0 parts sodium formaldehyde sulfoxylate dihydrate in 30.7 parts demineralized water is added dropwise, uniformly over a period of one and a half hours, together with a solution of 1.4 parts a 70% tert-butyl hydroperoxide solution in 26.9 parts demineralized water. This is followed by another hour of stirring at 75° C., before the in-situ polymerized miniemulsion is cooled to room temperature and filtered (nylon filter bag with an 80-μm cut-off).

Particle size (Z-average): 274 nm

PDI: 0.24

Solids (drying for 30 minutes at 180° C.): 31.1%

Production of a Grinding Resin R3 Equipped with Pigment-Affinic Polyethylene Oxide Groups Production of the Epoxy Amine Monoadduct EA1:

62.6 parts a diglycidyl ether based on bisphenol A (EEW 475 g/eq) (Epikote 1001, product sold by Momentive Speciality Chemicals Inc.) is heated to 60° C. under stirring with 44.2 parts styrene in a reaction vessel equipped with a stirrer, a reflux condenser, a temperature sensor, and a nitrogen inlet. Then, 6.5 parts diethanolamine is added dropwise such that the temperature does not exceed 70° C. This is followed by stirring until all of the NH equivalents have been reacted and an EPA value of 1.14 mmol/g has been achieved.

Production of the Monomer Mixture 8.0 parts isobornyl methacrylate, 43.0 parts methyl methacrylate, 37.0 parts butyl acrylate, 5.1 parts hydroxyethyl methacrylate, 14.0 parts polyethylene glycol methyl ether methacrylate (number-average molecular weight ~300 g/mol), 49.0 parts bisphenol A diglycidyl ether (EEW 186 g/eq) (Araldit GY 2600, product sold by BASF SE), 17.44 parts Super Iso Stable (TDI-trimethylol propane adduct, blocked with 3 equivalents phenol, product sold by Super Urecoat Industries), 0.8 parts tert-dodecyl mercaptan, and 51.5 parts the emulsifier EA1 are added to EA1 at room temperature and stirred until there is a solution. Then, 7.0 parts 80% lactic acid is added and stirred for ten minutes at room temperature. 550.6 parts demineralized water is then added slowly under vigorous stirring. The resulting crude emulsion is then stirred for at least another five minutes.

Production of the Miniemulsion:

The crude emulsion is transferred to an apparatus for applying high shear forces, and then twice homogenized passagewise at 600 bar with a high-pressure homogenizer (model 110Y from Microfluidics, equipped with a H230Z and H210Z homogenization chamber).

In-Situ Polymerization of the Miniemulsion:

The miniemulsion is then heated to 75° C. under stirring in a reaction vessel equipped with a stirrer, reflux condenser, temperature sensor, nitrogen inlet, and dosage unit. At 75° C., 0.2 parts a 1% iron (II) sulfate solution is added, and a solution of 1.0 parts sodium formaldehyde sulfoxylate dihydrate in 30.7 parts demineralized water is added dropwise, uniformly over a period of one and a half hours, together with a solution of 1.4 parts a 70% tert-butyl hydroperoxide solution in 26.9 parts demineralized water. This is followed by another hour of stirring at 75° C., before the in-situ polymerized miniemulsion is cooled to room temperature and filtered (nylon filter bag with an 80-μm cut-off).

Particle size (Z-average): 115 nm
PDI (Particle Distribution Index): 0.16
Solids (drying for 30 minutes at 180° C.): 34.0

Production of a Grinding Resin R4 Equipped with Quaternary Ammonium Groups

Production of the Epoxy Amine Monoadduct EA2:

137.0 parts a diglycidyl ether based on bisphenol A (EEW 475 g/eq) (Epikote 1001, product sold by Momentive Speciality Chemicals Inc.) is heated to 60° C. under stirring with 95.7 parts styrene in a reaction vessel equipped with a stirrer, a reflux condenser, a temperature sensor, and a nitrogen inlet. Then, 41.5 parts di(methyl)ethanol ammonium lactate (see also: Production of the emulsifier EQ1) is added dropwise such that the temperature does not exceed 70° C. This is followed by stirring until all of the NH equivalents have been reacted and a MEQ acid value (milliequivalent acid value) of 0.04 mmol/g has been achieved.

Production of the Monomer Mixture 17.3 parts isobornyl methacrylate, 93.0 parts methyl methacrylate, 80.2 parts butyl acrylate, 11.1 parts hydroxyethyl methacrylate, 81.6 parts bisphenol A diglycidyl ether (EEQ 186 g/eq) (Araldit GY 2600, product sold by BASF SE), 1.8 parts tert-dodecyl mercaptan, and 119.0 parts the emulsifier EQ1 are added to EA2 at room temperature, and stirred until there is a solution. 1191.4 parts demineralized water is then added slowly under vigorous stirring. The resulting crude emulsion is then stirred for at least another five minutes.

Production of the Miniemulsion:

The crude emulsion is transferred to an apparatus for applying high shear forces, and then twice homogenized passagewise at 600 bar with a high-pressure homogenizer (model 110Y from Microfluidics, equipped with a H230Z and H210Z homogenization chamber).

In-Situ Polymerization of the Miniemulsion:

The miniemulsion is then heated to 75° C. under stirring in a reaction vessel equipped with a stirrer, reflux condenser, temperature sensor, nitrogen inlet, and dosage unit. At 75° C., 0.4 parts a 1% iron (II) sulfate solution is added, and a solution of 2.2 parts sodium formaldehyde sulfoxylate dihydrate in 66.5 parts demineralized water is added dropwise, uniformly over a period of one and a half hours, together with a solution of 3.1 parts a 70% tert-butyl hydroperoxide solution in 58.2 parts demineralized water. This is followed by another hour of stirring at 75° C., before the in-situ polymerized miniemulsion is cooled to room temperature and filtered (nylon filter bag with an 80-μm cut-off).

Particle size (Z-average): 59 nm
PDI (Particle Distribution Index): 0.12
Solids (drying for 30 minutes at 180° C.): 30.4

Production of a Grinding Resin R5 Stabilized with the Emulsifier E2

Production of the Monomer Mixture 22.9 parts isobornyl methacrylate, 123.0 parts methyl methacrylate, 106.0 parts butyl acrylate, 14.7 parts hydroxyethyl methacrylate, 126.7 parts styrene, 320.8 parts Araldit GY 2600 (EEW 186 g/eq), 50.0 parts Super Iso Stable (TDI-trimethylol propane adduct, blocked with 3 equivalents phenol, product sold by Super Urecoat Industries), 2.4 parts tert-dodecyl mercaptan, and 159.5 parts the emulsifier E2 are stirred in a suitable vessel until there is a solution. 1576.8 parts demineralized water is then added slowly under vigorous stirring. The resulting crude emulsion is then stirred for at least another five minutes.

Production of the Miniemulsion:

The crude emulsion is transferred to an apparatus for applying high shear forces, and then twice homogenized passagewise at 600 bar with a high-pressure homogenizer (model 110Y from Microfluidics, equipped with a H230Z and H210Z homogenization chamber).

In-Situ Polymerization of the Miniemulsion:

The miniemulsion is then heated to 75° C. under stirring in a reaction vessel equipped with a stirrer, reflux condenser, temperature sensor, nitrogen inlet, and dosage unit. At 75° C., 0.6 parts a 1% iron (II) sulfate solution is added, and a solution of 3.0 parts sodium formaldehyde sulfoxylate dihydrate in 88.0 parts demineralized water is added dropwise, uniformly over a period of one and a half hours, together with a solution of 4.1 parts a 70% tert-butyl hydroperoxide solution in 77.0 parts demineralized water. This is followed by another hour of stirring at 75° C., before the in-situ polymerized miniemulsion is cooled to room temperature and filtered (nylon filter bag with an 80-μm cut-off).

Particle size (Z-average): 82 nm
PDI: 0.07
Solids (drying for 30 minutes at 180° C.): 31.5%

Production of a Poorly-Soluble Bismuth-Containing Pigment Paste P1 with the Grinding Resin R1

In a stainless steel dissolver container equipped with a cooling jacket, 51.1 parts the grinding resin R1 is premixed together with 0.1 parts phenoxypropanol and 0.8 parts a wetting and dispersing agent (Disperbyk 1 10, product sold by Byk Chemie GmbH) briefly with a dissolver disc—adapted to the container size—on a dissolver (Firma VME- Getzmann GmbH, model Dispermat® FM10-SIP). Then, 6.1 parts bismuth subnitrate, 1.5 parts Deuteron MK-F6 (thermoset matting plastic, product sold by Deuteron GmbH), 0.5 parts Carbon Black Monarch 120 (black pigment; product sold by Cabot Corp.), 0.2 parts Lanco PEW 1555 (hard, hydrophilic low-molecular polyethylene wax; product sold by Lubrizol Advanced Materials Inc.), 10.7 parts aluminum silicate ASP 200 (at least 98% kaolin fraction; product sold by BASF SE), and 30.95 parts titanium dioxide R 900-28 (titanium dioxide of the rutile type; product sold by E. I. du Pont de Nemours and Company) are added successively under stirring. The mixture is thereupon predissolved for 10 minutes at about 800 Upm and next ground with a Teflon disc adapted to the container size, with grinding pearls made of zirconium dioxide (Silibeads type ZY, diameter 1.2 to 1.4 mm) and a pearl/ground material ratio of 1/1 (w/w) at 2500 Upm, until a fineness of <12 μm, as measured with a grindometer, is achieved.

Production of Bismuth-Free Pigment Pastes P2 to P5 with the Grinding Resins R2 to R5

After the process for producing the pigment paste P1, the pigment pastes P2 to P5 are produced with the exclusion of the addition of the bismuth subnitrate, with the compositions set forth in table 1 (all data is given in parts by weight):

TABLE 1

|  | P2 | P3 | P4 | P5 |
|---|---|---|---|---|
| Grinding resin: | | | | |
| R2 | 52.7 | | | |
| R3 | | 52.7 | | |
| R4 | | | 54.46 | |
| R5 | | | | 51.1 |
| Phenoxypropanol | 0.1 | 0.1 | 0.1 | 0.1 |
| Disperbyk 110 | 0.8 | 0.8 | 0.8 | 0.8 |
| Deuteron MK-F6 | 1.5 | 1.5 | 1.5 | 1.5 |
| Carbon Black Monarch 120 | 0.5 | 0.5 | 0.5 | 0.5 |
| Lanco PEW 1555 | 0.2 | 0.2 | 0.2 | 0.2 |
| ASP 200 | 10.7 | 10.7 | 10.7 | 10.7 |
| Titanium dioxide R 900-28 | 30.95 | 30.95 | 30.95 | 30.95 |

Production of a Bismuth-Free Pigment Paste VP1 not According to the Invention

In a stainless steel dissolver container equipped with a cooling jacket, 38.9 parts a conventional grinding resin based on an epoxy prepolymer (CathoGuard® 500 grinding resin, a product sold by the company BASF Coatings GmbH) reacted with amine groups is premixed together with 7.5 parts demineralized water, 0.1 parts phenoxypropanol, and 0.8 parts a wetting and dispersing agent (Disperbyk 1 10, product sold by Byk Chemie GmbH) briefly with a dissolver disc—adapted to the container size—on a dissolver (Firma VME-Getzmann GmbH, model Dispermat® FM10-SIP). Then, 1.5 parts Deuteron MK-F6 (product sold by Deuteron GmBH), 0.5 parts Carbon Black Monarch 120 (product sold by Cabot Corp.), 0.2 parts Lanco PEW 1555 (product sold by Lubrizol Advanced Materials Inc.), 10.7 parts aluminum silicate ASP 200 (product sold by BASF SE), and 30.95 parts titanium dioxide R 900-28 (product sold by E. I. du Pont de Nemours and Company) are added successively, with stirring. The mixture is thereupon predissolved for 10 minutes at about 800 Upm and next ground with a Teflon disc adapted to the container size, with grinding pearls made of zirconium dioxide (Silibeads type ZY, diameter 1.2 to 1.4 mm) and a pearl/ground material ratio of 1/1 (w/w) at 2500 Upm, until a fineness of <12 μm, as measured with a grindometer, is achieved.

Production of a Cationic Electrocoating Baths B1 for Verifying the Corrosion Protection Properties without the Bismuth Complex 2155.0 parts a 40% cationic electrocoat dispersion (CathoGuard® 520, product sold by BASF Coatings GmbH) is mixed with 2449.0 parts demineralized water. Then, 370.0 parts the pigment paste P1 and 24 parts a polyvinyl alcohol EH 240 (product sold by BASF Coatings GmbH) are added under stirring. The finished bath is stirred for at least 24 hours, before it can be tested.

Production of Cationic Electrocoating Baths B2 to B5 for Verifying the Corrosion Protection Properties with the Bismuth Complex 2130.0 parts a 40% cationic electrocoat dispersion (CathoGuard® 520, product sold by BASF Coatings GmbH) is mixed with 2476.0 parts demineralized water. Then, 327.0 parts the pigment paste P2 is added with stirring, together with 67.0 parts an aqueous bismuth L(+) lactate solution. The finished bath is stirred for at least 24 hours, before it can be tested.

Additional test baths are produced according to the above procedure, with the compositions set forth in table 2:

TABLE 2

|  | B2 | B3 | B4 | B5 | Comparative example |
|---|---|---|---|---|---|
| Demineralized water | 2476.0 | 2481.5 | 2470.0 | 2481.5 | 2497.0 |
| Binder-Dispersion CathoGuard® 520 | 2130.0 | 2130.0 | 2130.0 | 2130.0 | 2130.0 |
| Pigment paste: | | | | | |
| P2 | 327.0 | | | | |
| P3 | | 321.5 | | | |
| P4 | | | 333.0 | | |
| P5 | | | | 321.5 | |
| VP1 | | | | | 306.0 |
| Bismuth L(+)-lactate 11.9% Bi | 67.0 | 67.0 | 67.0 | | 67.0 |

Oiled test sheets from Chemetall of the size 100×200 mm with the designation Gardobond AA 6014 were first cleaned for three minutes in a 60° warm degreasing bath. For this purpose, 30.0 g Ridoline 1565 and 3.0 g Ridosol 1561 (both products from Henkel AG & Co. KGaA) were added to 1 liter of tap water, with stirring. The pH value was adjusted to 11.0. After the degreasing, the sheets were each rinsed for one minute in tap water and then in demineralized water.

Immediately thereafter, a sheet was hung in each of the test baths, and connected as the cathode. A stainless steel anode measuring 30×70 mm was located as an antipole in the bath. In the first step, a voltage of 5 volts was applied directly for one minute. Then, the voltage was raised to 200 to 300 volts, depending on the bath, within 30 seconds. This voltage was held for two minutes. Then, the test sheet was taken out from the bath, and the adhered, non-coagulated lacquer was rinsed off with demineralized water.

The sheet was cross-linked for 30 minutes at 180° C. convection in a commercially-available paint-drying oven of the brand Heraeus.

The selected voltage programs allow for a dry film layer thickness of about 20 μm on the test sheet after the cross-linking. This was determined non-destructively, with a device from Electrophysik, with the trade name Minitest 720.

Corrosion Protection Results:

TABLE 3

| Filiform corrosion after 1008 hours (as assessed according to the Daimler method) | B1 | Comparative example |
|---|---|---|
| mean thread length [mm] | 1.6 | 10.2 |
| max. thread length [mm] | 2.9 | >10 |

TABLE 4

| Filiform corrosion after 1008 hours (as assessed according to the Daimler method) | B2 | B3 | B4 | B5 | Comparative example |
|---|---|---|---|---|---|
| mean thread length [mm] | 2.4 | 1.4 | 2.3 | 1.1 | 4.5 |
| max. thread length [mm] | 5.2 | 4.2 | 5.6 | 4.5 | 8.1 |

For all of the coatings B1 to B5 according to the invention, it can be see that the filiform corrosion is significantly reduced as compared to the respective comparative example.

The invention claimed is:

1. A method for producing a pigment- and/or filler-containing formulation, wherein one or more solids selected from the group of the pigments and fillers are mixed with an aqueous, cationically stabilized primary dispersion comprising:
   (1) dispersed polymer particles, which
      i. have a Z-average particle diameter of 5 to 500 nm, and
      ii. which are obtained through emulsion polymerization of at least one olefinically unsaturated monomer (A), wherein the emulsion polymerization takes place in the presence of one or more emulsifiers selected from the group consisting of (E), (EQ), and mixtures thereof and wherein (E) and (EQ) having the following formulas:

$R^1$—$N(R^2)(R^3)$                       (E),

$R^1$—$N^{\oplus}(R^2)(R^3)(R^4)X^{\ominus}$           (EQ), where:
      $R^1$ is a moiety that contains at least one aromatic group and at least one aliphatic group, has 15 to 40 carbon atoms, and contains at least one functional group selected from the group consisting of hydroxy groups, thiol groups, primary amino groups, secondary amino groups, at least one carbon-carbon multiple bond, and mixtures thereof;
      $R^2$, $R^3$, and $R^4$ are, independently of each other, identical or different aliphatic moieties having 1 to 14 carbon atoms;
      and $X^{\ominus}$ stands for the acid anion of an organic or inorganic acid HX, and
   (2) optionally wherein the pigments and/or fillers are mechanically crushed.

2. The method according to claim 1, wherein the moiety $R^1$— has the structure $Gr_{ali1}$-$Gr_{arom}$-$Gr_{ali2}$, where $Gr_{arom}$ stands for an aromatic group, $Gr_{ali1}$ stands for a first aliphatic group, and $Gr_{ali2}$ stands for a second aliphatic group.

3. The method according to claim 2, wherein the moiety $R^1$ has at least one carbon-carbon multiple bond in the aliphatic group $Gr_{ali1}$.

4. The method according to claim 2, wherein the moiety $R^1$ has at least one functional group selected from the group consisting of hydroxy groups, thiol groups, primary amino groups, secondary amino groups, and mixtures thereof in the aliphatic group $Gr_{ali2}$.

5. The method according to claim 4, wherein the moiety $R^1$ has, in the aliphatic group $Gr_{ali2}$, at least one functional group selected from the group consisting of hydroxy groups, thiol groups, primary amino groups, and secondary amino groups in the beta position to the nitrogen atom of the general formulas of the emulsifiers (E) and (EQ) according to claim 1.

6. The method according to claim 2, wherein
   $Gr_{ali1}$ is linear, unsubstituted, and heteroatom-free, and has one to three carbon-carbon double bonds;
   $Gr_{arom}$ is a phenylene or naphthylene group; and
   $Gr_{ali2}$ is linear, bears a hydroxy group in the beta position to the nitrogen atom in the general formulas of the emulsifiers (E) and (EQ), and additionally contains O as a heteroatom, in the form of an ether group.

7. The method according to claim 1, wherein at least two of the moieties $R^1$, $R^2$, $R^3$, and $R^4$ bear a functional group selected from the group consisting of hydroxy groups, thiol groups, primary amino groups, secondary amino groups, and mixtures thereof.

8. The method according to claim 7, wherein in addition to the at least one group selected from hydroxy groups, thiol groups, primary amino groups, secondary amino groups, the at least two of the moieties $R^2$, $R^3$, and $R^4$ bear at least one other functional group selected from the group consisting of ether groups, ester groups, and amide groups.

9. The method according to claim 1, wherein $X^{\ominus}$ is the acid anion of an acid HX that is selected from the group of non-hydroxy-functional carboxylic acids and monohydroxy-functional carboxylic acids.

10. The method according to claim 1, wherein a mixture of different emulsifiers selected from (E), (EQ), and mixtures thereof is used, in which more than 50 mol % of the moiety $R^1$ contains carbon-carbon multiple bonds.

11. The method according to claim 1, wherein the olefinically unsaturated monomer (A) is selected from the group consisting of:
   a1) acid group-free (meth)acrylic acid esters;
   a2) monomers that: bear at least one hydroxy group, one primary or secondary, or tertiary, or quaternary amino group, one alkylxymethylamino group, or one imino group per molecule; are acid group-free; and are different from the emulsifiers (E) and (EQ);
   a3) monomers bearing, per molecule, at least one acid group that can be converted into the corresponding acid anion group;
   a4) vinyl esters of α-branched monocarboxylic acids having 5 to 18 carbon atoms in the molecule;
   a5) reaction products of acrylic acid and/or methacrylic acid with the glycidyl ester of an α-branched monocarboxylic acid having 5 to 18 carbon atoms per molecule;
   a6) cyclic or acyclic olefins;
   a7) (meth)acrylamides;
   a8) epoxy group-containing monomers;
   a9) vinyl aromatic hydrocarbons;
   a10) acrylonitrile or methacrylonitrile;
   a11) vinyl compounds selected from the group of vinyl halides, vinylidene dihalides, N-vinylamides, vinyl ethers, and vinyl esters that are different from the monomers a4);
   a12) allyl compounds;

a13) polysiloxane macromonomers having a number-average molecular weight $M_n$ of 1000 to 40,000 and a mean of 0.5 to 2.5 ethylenically unsaturated double bonds per molecule;

a14) acryloxy silane-containing vinyl monomers; and mixtures thereof.

12. The method according to claim 11, wherein the olefinically unsaturated monomer (A) is selected from the group consisting of the monomers a1), a2), a9), and mixtures thereof.

13. The method according to claim 11, wherein a mixture of olefinically unsaturated monomers (A) is used, comprising:

monomers a1) selected from the group of (meth)acrylic acid alkyl esters or (meth)acrylic acid cycloalkyl esters having up to 20 carbon atoms in the alkyl or cycloalkyl group;

monomers a2) selected from the group consisting of monomers bearing at least one hydroxy group one primary amino group, one secondary amino group, one tertiary amino group, or one quaternized amino group; and styrene as a monomer a9).

14. The method according to claim 1, wherein, in order to produce the aqueous, cationically stabilized primary dispersion:

(1) the olefinically unsaturated monomer(s) (A) and the emulsifier(s) (E) and/or (EQ) are placed in an aqueous medium, optionally with a cross-linking agent and/or additional binders, (2) and then converted into a miniemulsion by using high shear forces, and (3) then an emulsion polymerization is performed.

15. The method according to claim 14, wherein one or more cross-linking agents selected from the group consisting of blocked polyisocyanates, trs(alkoxycarbonylamino) triazines, and fully etherified aminoplast resins are used as the cross-linking agents.

16. The method according to claim 14, wherein an epoxy amine adduct is used as an additional binder.

17. The method according to claim 14, wherein the polymerization is performed at a temperature of 25° C. to 95° C. and/or a pressure of 1.5 to 3000 bar.

18. The method according to claim 14, wherein the emulsion polymerization is initiated by water-soluble initiators selected from the group consisting of sodium persulfate, potassium persulfate, ammonium persulfate, tert-butyl hydroperoxide, and mixtures thereof.

19. A pigment- and/or filler-containing formulation, which is produced according to the method of claim 1.

20. An aqueous preparation comprising a cathodically depositable binder and a pigment- and/or filler-containing formulation according to claim 19.

21. The aqueous preparation according to claim 20, wherein said aqueous preparation is an electrocoat composition.

22. The aqueous preparation according to claim 20, wherein the aqueous preparation contains at least 30 ppm bismuth in a dissolved form, relative to the total preparation.

23. The aqueous preparation according to claim 20 cathodically electrocoated onto a metal substrate.

24. The aqueous preparation according to claim 23, wherein the metal substrate is an aluminum substrate.

25. A method for cathodically electrocoating electrically conductive substrates, wherein an aqueous composition according to claim 20 is used to electrocoat an electrically conductive substrate.

26. The method according to claim 25, wherein the electrocoat is deposited in two stages, and, in the first stage, a voltage in the range of 10 to 50 V is applied, and in the second stage, a voltage in the range of 50 to 400 V is applied, under the condition that the voltage in the second stage is at least 10 V higher than the voltage applied in the first stage, and that the voltage in each of the two stages is maintained in the relevant range for at least 10 seconds.

27. An electrically conductive substrate, coated according to the method of claim 25.

28. The electrically conductive substrate according to claim 27, wherein the electrically conductive substrate is a metallic substrate.

29. The electrically conductive substrate according to claim 28, wherein the metallic substrate is an aluminum substrate.

30. The electrically conductive substrate according to claim 27, wherein the electrically conductive substrate comprises an automobile body or part thereof.

\* \* \* \* \*